(12) United States Patent
Isaji et al.

(10) Patent No.: US 8,818,680 B2
(45) Date of Patent: Aug. 26, 2014

(54) VEHICLE BEHAVIOR CONTROL DEVICE

(75) Inventors: Kazuyoshi Isaji, Kariya (JP); Naohiko Tsuru, Handa (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 13/600,580

(22) Filed: Aug. 31, 2012

(65) Prior Publication Data

US 2013/0080019 A1    Mar. 28, 2013

(30) Foreign Application Priority Data

Sep. 24, 2011    (JP) ................................ 2011-208294

(51) Int. Cl.
*G05D 1/00* (2006.01)
*B60W 30/16* (2012.01)

(52) U.S. Cl.
CPC .................................... *B60W 30/16* (2013.01)
USPC ......................................................... 701/96

(58) Field of Classification Search
CPC ........ B60W 30/16; B60W 30/09; G06G 7/78; G01G 1/16; G01S 19/931
USPC ..................... 701/96, 300, 301, 498; 340/903
See application file for complete search history.

(56) References Cited

U.S. PATENT DOCUMENTS

| | | | | |
|---|---|---|---|---|
| 7,359,788 | B2 * | 4/2008 | Arai ................ | 701/96 |
| 7,623,956 | B2 * | 11/2009 | Kawaguchi ................ | 701/117 |
| 7,987,038 | B2 * | 7/2011 | Inoue et al. ................ | 701/96 |
| 2007/0021876 | A1 * | 1/2007 | Isaji et al. ................ | 701/1 |
| 2007/0276574 | A1 | 11/2007 | Isaji et al. | |
| 2008/0059037 | A1 | 3/2008 | Isaji et al. | |
| 2008/0288152 | A1 | 11/2008 | Isaji et al. | |
| 2010/0023232 | A1 | 1/2010 | Isaji et al. | |

FOREIGN PATENT DOCUMENTS

| | | |
|---|---|---|
| JP | 2006-024104 | 1/2006 |
| JP | 2006-293530 | 10/2006 |
| JP | 2007-001383 | 1/2007 |
| JP | A-2007-179388 | 7/2007 |

OTHER PUBLICATIONS

Office Action mailed Sep. 3, 2013 in the corresponding JP application No. 2011-208294 (English translation attached).
Office Action mailed Jun. 3, 2014 in the corresponding JP application No. 2011-208294 (and English translation).

* cited by examiner

*Primary Examiner* — Mary Cheung
(74) *Attorney, Agent, or Firm* — Posz Law Group, PLC

(57) ABSTRACT

A vehicle behavior control device for controlling acceleration/deceleration includes: a velocity acquisition device; a current position acquisition device; a preceding vehicle determination device; a following distance detection device; a preceding vehicle information acquisition device; a relative velocity calculation device of a preceding vehicle; a first evaluation index calculation device of a first evaluation index indicating an approaching/separating state to the preceding vehicle in view of the preceding vehicle velocity; a first deceleration target determination device for determining whether the first evaluation index exceeds a first deceleration threshold; and a following deceleration calculation device for calculating a first required deceleration when the first evaluation index exceeds the first deceleration threshold. The first required deceleration provides to match an actual relative velocity with a first target relative velocity, which is determined based on the first evaluation index and the following distance.

10 Claims, 8 Drawing Sheets

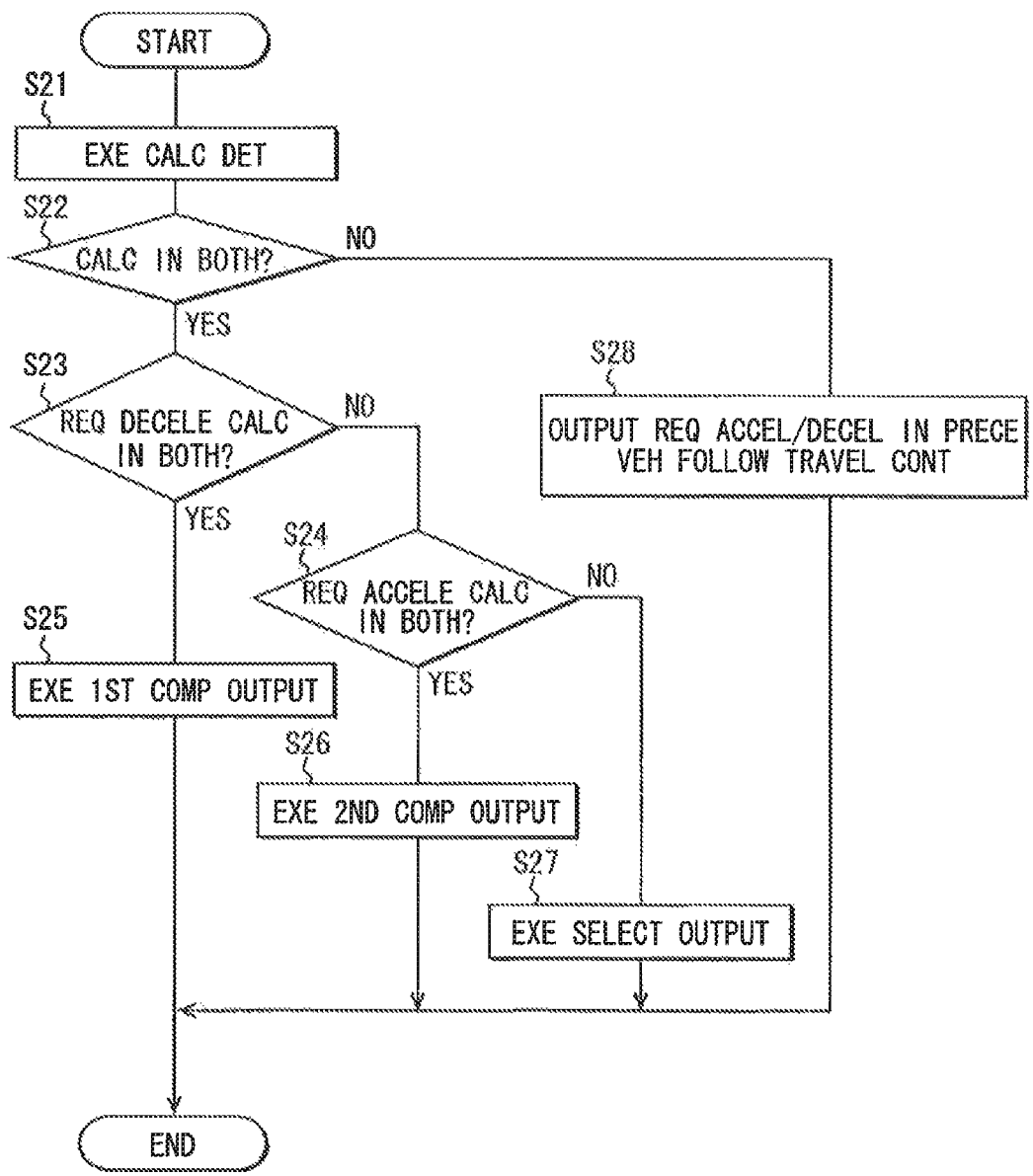

VEHICLE BEHAVIOR CONTROL DEVICE

CROSS REFERENCE TO RELATED APPLICATION

This application is based on Japanese Patent Application No. 2011-208294 filed on Sep. 24, 2011, the disclosure of which is incorporated herein by reference.

TECHNICAL FIELD

The present disclosure relates to a vehicle behavior control device.

BACKGROUND

There is hitherto known technology called the adaptive cruise control (ACC) which detects a following distance between an own vehicle and a preceding vehicle with a ranging sensor such as a laser radar, and which controls automatically the following distance to the preceding vehicle, thereby performing the following traveling.

In recent years, there is known technology as disclosed by Patent Literature 1 which performs preceding vehicle following traveling using a compensated approaching/separating state evaluation index KdB_c, obtained by compensating an approaching/separating state evaluation index KdB in consideration of the velocity of a preceding vehicle. The approaching/separating state evaluation index KdB is an index which expresses the change degree per unit time of the area of an assumed image of an object in front, to be viewed by eyes of the driver.

The approaching/separating state evaluation index KdB and the compensated approaching/separating state evaluation index KdB_c described above are expressed, for example, by Equations 1 and 2 in the following, respectively. In Equations 1 and 2, D is a following distance between an own vehicle and a preceding vehicle, Vr is a relative velocity of the preceding vehicle to the own vehicle, a is a multiplier, and Vp is a velocity of the preceding vehicle.

(Equation 1)

$$KdB = 10 \times \log_{10}\left(\left|4 \times 10^7 \times \frac{Vr}{D^3}\right|\right) \quad \text{(Eq. 1)}$$

(Equation 2)

$$KdB\_c(a) = 10 \times \log_{10}\left(\left|4 \times 10^7 \times \frac{Vr - aVp}{D^3}\right|\right) \quad \text{(Eq. 2)}$$

As shown in Equation 1, the compensated approaching/separating state evaluation index KdB_c becomes greater as the absolute value of the relative velocity Vr approaching the preceding vehicle becomes greater. It becomes smaller as the velocity of the preceding vehicle Vp is higher and becomes greater as the following distance is shorter. Since the following distance D appears in a cubic term, the increasing gradient of the compensated approaching/separating state evaluation index KdB_c to the decreasing change of the following distance D becomes steeper as the following distance D becomes shorter. As disclosed by Patent Literature 1, when the preceding vehicle following traveling is performed by use of the compensated approaching/separating state evaluation index, it is possible to perform the following traveling with little feeling of discomfort.

However, when following a preceding vehicle by the ACC and entering a curve way, there arises the following issue. Specifically, when the preceding vehicle travels in a curve way at a high speed with excessive lateral acceleration, the own vehicle enters the curve way without decelerating sufficiently so as to maintain the distance to the preceding vehicle. Accordingly, the own vehicle is also forced to travel in the curve way at a high speed, following the preceding vehicle. Therefore, there is an issue that a driver will feel fear or the ACC will be canceled by the driver stepping on a brake because of the fear.

As other issues, in the ACC, when the preceding vehicle runs out of a detection range of the ranging sensor of the own vehicle, the own vehicle enters automatically into traveling at a set vehicle velocity (that is a vehicle velocity set by the driver). Accordingly, when the preceding vehicle runs out of the detection range of the ranging sensor of the own vehicle in the state where the own vehicle is traveling at a speed less than the set vehicle velocity of the own vehicle until just before entering a curve way, the own vehicle will be accelerated up to the set vehicle velocity of the own vehicle, and sufficient deceleration may not be attained at the time of entering the curve way. Accordingly, the own vehicle is forced to travel in the curve way at a high speed, and therefore, there is an issue that a driver will feel fear or the ACC will be canceled by the driver stepping on a brake because of the fear.

As a means to solve the present issue, Patent Literature 2 discloses technology which enables deceleration control corresponding to the feeling of danger of the driver at the time of entering a curve way, by use of the approaching/separating state evaluation index KdB. When explained in detail, in the technology disclosed by Patent Literature 2, the distance between an own vehicle and the road boundary of a curve way existing ahead of the own vehicle or a road collateral object provided in the neighborhood is acquired by use of a ranging sensor such as a laser radar. Next, in consideration of the acquired distance to the road boundary or the road collateral object and the velocity of the own vehicle, the compensated approaching/separating state evaluation index KdB_c is calculated to be used as the starting timing of deceleration corresponding to the feeling of danger of the driver at the time of entering the curve way. Then, by determining the deceleration starting timing before entering the curve way by use of the calculated compensated approaching/separating state evaluation index KdB_c, it is possible to start the deceleration control to the timing corresponding to the feeling of danger of the driver at the time of entering the curve way.

However, when the distance to the road boundary of the curve way existing ahead of the own vehicle or the road collateral object provided in the neighborhood cannot be acquired by an autonomous sensor such as a ranging sensor, the technology disclosed by Patent Literature 2 raises an issue that it is difficult to start the deceleration control to the timing corresponding to the feeling of danger of the driver at the time of entering a curve way. For example, when employing a ranging sensor such as a laser radar as the distance acquisition means, there may be occasions when it is difficult to acquire the distance to the road boundary or the road collateral object due to interruption by the preceding vehicle.

In the technology disclosed by Patent Literature 2, the deceleration control is started to the timing corresponding to the feeling of danger of the driver at the time of entering a curve way; accordingly, when the preceding vehicle enters the curve way at a speed slower than needed, the following distance to the preceding vehicle concerned may become too short, and it is likely to induce feeling of discomfort to the driver.

(Patent Literature 1) Japanese Patent Laid-open No. 2008-280017
(Patent Literature 2) Japanese Patent No. 4289421

SUMMARY

It is an object of the present disclosure to provide a vehicle behavior control device which can perform following traveling with little feeling of discomfort for a driver, and which can, at the same time, execute more reliably the deceleration control corresponding to the feeling of danger of the driver at the time of entering a curve way.

According to an aspect of the present disclosure, a vehicle behavior control device for acquiring information via radio communication equipment, which transmits and receives the information by inter-vehicle communication, and for controlling acceleration and deceleration of a vehicle, the vehicle behavior control device includes: a velocity acquisition device for acquiring a vehicle velocity of the vehicle successively; a current position acquisition device for acquiring a current position of the vehicle successively; a preceding vehicle determination device for determining a preceding vehicle of the vehicle, wherein the inter-vehicle communication between the vehicle and the preceding vehicle is established; a following distance detection device for detecting a following distance between the vehicle and the preceding vehicle; a preceding vehicle information acquisition device for successively acquiring preceding vehicle information, which is transmitted successively from the preceding vehicle by the inter-vehicle communication, via the radio communication equipment, wherein the preceding vehicle information includes preceding vehicle condition information providing a preceding vehicle velocity of the preceding vehicle; a relative velocity calculation device for successively calculating a relative velocity between the vehicle and the preceding vehicle according to the vehicle velocity and the preceding vehicle velocity; a first evaluation index calculation device for calculating a first evaluation index, which indicates an approaching and separating state of the vehicle with respect to the preceding vehicle in view of the preceding vehicle velocity, wherein the first evaluation index becomes larger as the relative velocity of approaching the preceding vehicle becomes higher, and the first evaluation index becomes larger as the following distance with the preceding vehicle becomes shorter, and wherein the first evaluation index has an increasing gradient with respect to a narrowing change of the following distance, the increasing gradient which becomes steeper as the following distance becomes shorter; a first deceleration target determination device for determining whether the first evaluation index exceeds a predetermined first deceleration threshold; and a following deceleration calculation device for calculating a first required deceleration when the first deceleration target determination device determines that the first evaluation index exceeds the first deceleration threshold, wherein the first required deceleration provides to match an actual relative velocity between the vehicle and the preceding vehicle with a first target relative velocity, and wherein the first target relative velocity is determined based on the first evaluation index and the following distance to the preceding vehicle.

In the above vehicle behavior control device, by setting up the first target relative velocity, it is possible to calculate the first required deceleration so that the reduction degree of the relative velocity to the preceding vehicle becomes large, as the own vehicle approaches the preceding vehicle. Therefore, by decelerating the own vehicle in accordance with the first required deceleration, it becomes possible for a driver to get a favorable feeling of deceleration and to perform the following traveling with little feeling of discomfort for the driver.

BRIEF DESCRIPTION OF THE DRAWINGS

The above and other objects, features and advantages of the present disclosure will become more apparent from the following detailed description made with reference to the accompanying drawings. In the drawings:

FIG. 9 is a flow chart illustrating an example of the flow of required acceleration/deceleration output determination in the vehicle control ECU.

DETAILED DESCRIPTION

First Embodiment

Figure 1:
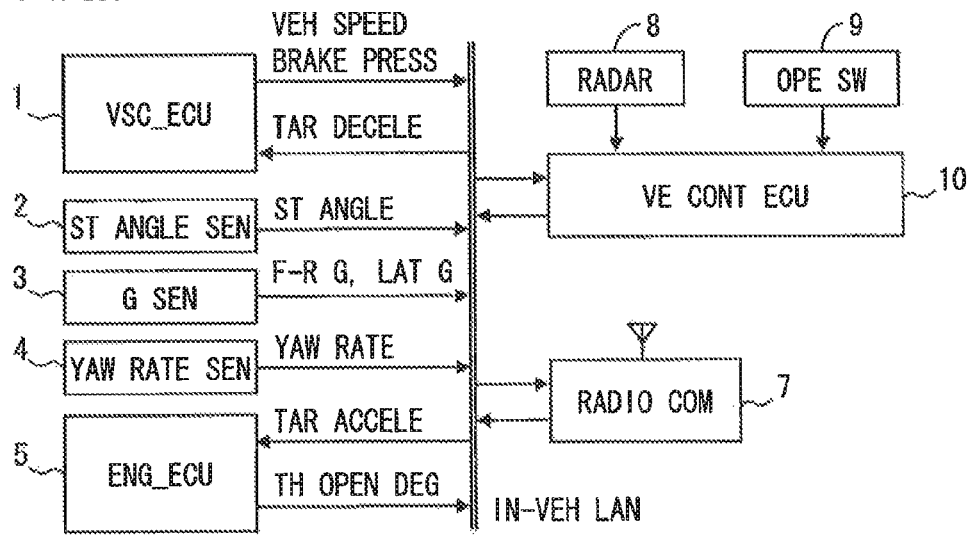
FIG. 1. is a block diagram illustrating a rough configuration of a driving support system.

Hereinafter, with reference to the accompanying drawings, the embodiments of the present disclosure are explained in detail. The present embodiment explains the case where a vehicle behavior control device of the present disclosure is applied to a driving support system 100. FIG. 1 illustrates the entire configuration of the driving support system 100 of the present embodiment. As illustrated in the figure, the present driving support system is composed of a VSC_ECU 1, a steering angle sensor 2, a G sensor 3, a yaw rate sensor 4, an ENG_ECU 5, radio communication equipment 7, a radar 8, an operation SW 9, and a vehicle control ECU 10.

The VSC_ECU 1 illustrated in FIG. 1 controls a brake actuator (not shown) for applying braking force to an own vehicle, and possesses the control function of the VSC (Vehicle Stability Control, a registered trademark) which suppresses a sideslip of the own vehicle. The VSC_ECU 1 receives information on a required deceleration from an in-vehicle LAN, and controls a brake actuator so that the required deceleration is generated in the own vehicle. The VSC_ECU 1 transmits the information on velocity (vehicle velocity) Vo and brake pressure of the own vehicle to the in-vehicle LAN. The steering angle sensor 2 detects information on a steering angle θ of a steering wheel of the own vehicle, and transmits the information on the detected steering angle θ to the in-vehicle LAN.

The G sensor 3 is an acceleration sensor which detects the acceleration developed in the anteroposterior direction of the own vehicle (anteroposterior G) and the acceleration developed in the lateral (right and left) direction (lateral G), and transmits the information on the detected anteroposterior G and lateral G to the in-vehicle LAN. The yaw rate sensor 4 detects angular velocity (yaw rate) around the vertical axis of the own vehicle, and transmits the information on the detected yaw rate to the in-vehicle LAN. The ENG_ECU 5 receives information on a required acceleration from the in-vehicle LAN, and controls a throttle actuator (not shown) so that the own vehicle develops the required acceleration. Also when the information on a required deceleration is received, the ENG_ECU 5 controls the throttle actuator to generate engine braking.

The radio communication equipment 7 is provided with a transceiver antenna, and transmits information on the own vehicle and receives information on other vehicles, to and from the other vehicles which are present in the circumference of the own vehicle, by a wireless communication without passing a telephone network (that is, by means of vehicle-to-vehicle communications). For example, in the case of the wireless communication using the radio wave of 700 MHz bands, vehicle-to-vehicle communications are performed with other vehicles which are present in the range of about 1 km in radius centered on the own vehicle position, and in the case of the wireless communication using the radio wave of 5.9 GHz bands, vehicle-to-vehicle communications are performed with other vehicles which are present in the range about 500 m in radius centered on the own vehicle position.

The radio communication equipment 7 transmits the vehicle information obtained from the in-vehicle LAN, such as the own vehicle velocity Vo and the steering angle θ, for example, as the information on the own vehicle, at a fixed transmission period of every 100 msec. It is assumed that the radio communication equipment 7 receives vehicle information of another vehicle transmitted from the radio communication equipment 7 included in the driving support system 100 mounted in another vehicle as a vehicle except for the own vehicle. The radio communication equipment 7 outputs the received information to the vehicle control ECU 10.

The radar 8 is a well-known laser radar for example, it irradiates a laser light to the prescribed range ahead of the own vehicle and receives the reflected light to detect a following distance D to a preceding vehicle, a relative velocity Vr1 to the preceding vehicle, the amount of discrepancy (the amount of lateral discrepancy) between the central axis of an own vehicle width and the central axis of a preceding vehicle, and others, and outputs them to the vehicle control ECU 10. It is also preferable to adopt a configuration in which the vehicle control ECU 10 performs the detection of the following distance D to the preceding vehicle, the relative velocity Vr1 to the preceding vehicle, the amount of discrepancy (the amount of lateral discrepancy) between the central axis of the own vehicle width and the central axis of the preceding vehicle, and others. In the present embodiment, the subsequent explanation is continued under the assumption that the detection is performed by the vehicle control ECU 10 based on the signal of the radar 8. The operation SW 9 is a switch group which the driver of the own vehicle operates, and the operation information of the switch group is outputted to the vehicle control ECU 10.

The vehicle control ECU 10 is mainly composed as a microcomputer, and is composed of all well-known CPU, ROM, RAM, I/O, and a bus coupling these components. The vehicle control ECU 10 executes various kinds of processing based on the variety of information inputted from the VSC_ECU 1, the steering angle sensor 2, the G sensor 3, the yaw rate sensor 4, the ENG_ECU 5, the radio communication equipment 7, the radar 8, and the operation SW 9.

A memory (a ROM, for example) of the vehicle control ECU 10 stores three threshold equations: a friction brake starting threshold equation, an engine braking starting threshold equation, and an acceleration control ending threshold equation. Each of these threshold equations is given by adding an offset value to the brake discriminant. Equation 3 expresses the brake discriminant.

(Equation 3)

$$KdB\_c(a) = b \log_{10} D + c \qquad (\text{Eq. 3})$$

The brake discriminant is an equation expressing the relation of KdB_c and the following distance D at the brake operation start time of a driver. In Equation 3, a, b, and c are constants which are fixed based on an experiment. a means a in Equation 2. a, b, and c are 0.2, −22.66, and 74.71, respectively, for example.

Since the brake discriminant is expressed by Equation 3, the friction brake starting threshold equation, the engine braking starting threshold equation, and the acceleration control ending threshold equation are expressed by Equation 4. Δc in Equation 4 is an offset value. As the offset value, the friction brake starting threshold equation employs a first brake offset value Δc1, the engine braking starting threshold equation employs a second brake offset value Δc2, and the acceleration control ending threshold equation employs an acceleration offset value Δc3. These offset values Δc1, Δc2, and Δc3 are −3 dB, −4 dB, and −6 dB, respectively, for example.

(Equation 4)

$$KdB\_c(a) = b \log_{10} D + c - \Delta c \qquad (\text{Eq. 4})$$

Depending on the magnitude of the offset values, the compensated approaching/separating state evaluation index KdB_c for the same following distance D decreases in the order of the brake discriminant, the friction brake starting threshold equation, the engine braking starting threshold equation, and the acceleration control ending threshold equation.

The vehicle control ECU 10 performs preceding vehicle following traveling control using the various equipment coupled by the in-vehicle LAN, etc. The preceding vehicle following control is started by a driver operating the operation SW 9 to provide a starting instruction of the preceding vehicle following control. The preceding vehicle following control is terminated by an end operation of a driver.

It is assumed that the preceding vehicle following control is started after determining a vehicle which is to be identified as the preceding vehicle for the own vehicle and is capable of vehicle-to-vehicle communications (hereinafter referred to as "following-target preceding vehicle determination"). Here, the following-target preceding vehicle determination is explained. In the following-target preceding vehicle determination, it is determined whether the nearest preceding vehicle detected by the radar 8 is a vehicle which is receiving vehicle information by means of the vehicle-to-vehicle communications. This determination is performed corresponding to whether the nearest preceding vehicle detected by the radar 8 and a vehicle of a transmitting source of the vehicle information specified from the received vehicle information resemble each other with respect to the velocity, the distance, and the relative position to the own vehicle.

For example, when the velocity and the distance are utilized, it is preferable to adopt a configuration in which, in the driving support system 100, the distance to a nearest following vehicle is also detected based on a signal of the radar 8 provided with a backward irradiation area as well, and the vehicle information including the information on the distance to the nearest following vehicle is transmitted via the radio communication equipment 7. Then, the above determination is performed according to whether the velocity of the nearest preceding vehicle and the distance from the own vehicle, which are detected based on the signal of the radar 8, resemble respectively the velocity of the other vehicle and the distance to the nearest following vehicle of the other vehicle, included in the received vehicle information.

When the relative position is utilized, it is preferable to adopt a configuration in which, in the driving support system 100, a position detector (not shown) detects position information successively, and the vehicle information including the position information is transmitted via the radio communication equipment 7. Then, the above determination is performed corresponding to whether the relative position of the nearest preceding vehicle which is detected based on the signal of the radar 8 resembles the relative position of the other vehicle of the transmitting source of the vehicle information. It is preferable to adopt a configuration in which the relative position of the other vehicle of the transmitting source of the vehicle information is calculated from the position information of the other vehicle included in the received vehicle information, and the position information detected with the position detector of the own vehicle. When the calculation of the relative position of the other vehicle is performed, it is assumed that the calculation is performed after matching the position information of the own vehicle with the position information of the other vehicle at the same time, by use of the GPS time when the position information is detected, for example.

Furthermore, in the following-target preceding vehicle determination, when the nearest preceding vehicle detected by the radar 8 is determined to be a vehicle which is receiving the vehicle information by the vehicle-to-vehicle communications, presentation indicating that this preceding vehicle is selectable as the vehicle of the following traveling target (hereinafter referred to as "selectable presentation") is made by means of a display and/or a voice output apparatus (not shown). Then, when the driver operates the operation SW 9 to select this preceding vehicle as the vehicle of the following traveling target during the selectable presentation or within a fixed time after the selectable presentation, it is determined that this preceding vehicle is the vehicle which is to be identified as the preceding vehicle for the own vehicle and is capable of the vehicle-to-vehicle communications (hereinafter referred to as "a following-target preceding vehicle"). Accordingly, the vehicle control ECU 10 corresponds to the preceding vehicle determination means.

When the following-target preceding vehicle is determined by the following-target preceding vehicle determination, the distance to the following-target preceding vehicle detected by the radar 8 is detected, based on the signal of the radar 8, and the detected distance (that is, an initial following distance to the following-target preceding vehicle) is set up as the target following distance Dt.

Hereinafter, the contents of the preceding vehicle following traveling control are explained in detail. The vehicle control ECU 10 calculates successively the current value of KdB_c (hereinafter, "following KdB_c") in the course of the preceding vehicle following traveling control. The following KdB_c is calculated from the evaluation index calculating equation shown in Equation 2. Therefore, it is necessary to determine the relative velocity Vr1 to the following-target preceding vehicle, the velocity Vp of the following-target preceding vehicle, and the following distance D, in calculation of the following KdB_c.

It is assumed that the velocity Vp is acquired successively via the radio communication equipment 7. Accordingly, the vehicle control ECU 10 corresponds to the preceding vehicle information acquisition means and the velocity acquisition means. The information on the vehicle velocity Vp of the following-target preceding vehicle (for the following-target preceding vehicle, it is the own vehicle velocity Vo) and the steering angle θ correspond to the preceding vehicle information. The relative velocity Vr1 is successively calculated from the own vehicle velocity Vo successively acquired from the VSC_ECU 1 and the velocity Vp of the following-target preceding vehicle successively acquired via the radio communication equipment 7. Accordingly, the vehicle control ECU 10 corresponds to the preceding vehicle-referenced relative velocity calculation means. It is preferable to adopt a configuration in which the following distance D is determined by calculating the distance increase and decrease from the target following distance Dt based on the relative velocity Vr1 calculated successively. Accordingly, the vehicle control ECU 10 corresponds to the following distance detection means. Then, the following KdB_c is successively calculated by substituting the values described above for Equation 2. Accordingly, the following KdB_c corresponds to the first compensated approaching/separating state evaluation index, and the vehicle control ECU 10 corresponds to the first evaluation index calculation means.

It is preferable to adopt a mode in which the relative velocity Vr1 and the following distance D are determined on the basis of a signal from the radar 8, for example. It is also preferable to adopt a mode in which the velocity Vp is calculated from the relative velocity Vr1 determined on the basis of a signal of the radar 8 and the own vehicle velocity Vo acquired from the VSC_ECU 1.

It has been described in the above that it is preferable to adopt a configuration in which the relative velocity Vr1, the velocity Vp of the following-target preceding vehicle, and the following distance D are determined based on the vehicle information obtained by means of the vehicle-to-vehicle communications, or to adopt a configuration in which they are determined based on a signal of the radar 8 of the own vehicle. However, it is also preferable to adopt a configuration in which they may be differently determined in a proper manner. For example, it is preferable to adopt a configuration in which, while it is possible for the radar 8 to detect the following-target preceding vehicle, they are determined based on a signal of the radar 8 of the own vehicle, and when it becomes impossible for the radar 8 to detect the following-target preceding vehicle (that is, when the radar has lost its hold), they are determined based on the vehicle information obtained by means of the vehicle-to-vehicle communications. The state of the radar losing its hold will occur when the following-target preceding vehicle disappears from the detection range of the radar 8, because the following-target preceding vehicle enters a curve way and deviates from the front of the own vehicle, for example.

It is also preferable to adopt a configuration in which the relative velocity Vr1, the velocity Vp of the following-target preceding vehicle, and the following distance D are determined sequentially, based on the vehicle information obtained by means of the vehicle-to-vehicle communications, and, at the same time, these values are determined periodically or sporadically, based on the signal of the radar 8, then the value determined based on the vehicle information is compensated, with reference to the value determined based on the signal of the radar 8.

The vehicle control ECU 10 calculates successively three thresholds: a friction brake starting threshold, an engine braking starting threshold, and an acceleration control ending threshold, in the course of the preceding vehicle following traveling control. These thresholds are calculated from three threshold equations stored in the memory: a friction brake starting threshold equation, an engine braking starting threshold equation, and an acceleration control ending threshold equation, with the current value of the following distance D. The friction brake starting threshold and the engine braking starting threshold correspond to the first deceleration threshold, and the acceleration control ending threshold corresponds to the first acceleration threshold.

It is preferable to adopt a configuration in which any one of the friction brake starting threshold and the engine braking starting threshold is employed as the first deceleration threshold. However, it is more preferable to adopt a configuration in which the engine braking starting threshold is used, for example. It is also possible to adopt a configuration in which a common value is employed as the deceleration threshold and the acceleration threshold.

The vehicle control ECU 10 compares the above-described target following distance Dt with the current following distance D in the course of the preceding vehicle following traveling control, and when the current following distance D is shorter than the target following distance Dt, the vehicle control ECU 10 determines to make the VSC_ECU 1 operate the friction brake, regardless of what kind of value the current value of KdB_c is, and calculates the following required deceleration.

On the other hand, when the current following distance D is longer than the target following distance Dt, the following KdB_c is compared with the friction brake starting threshold, the engine braking starting threshold, and the acceleration control ending threshold. The comparison result is classified into the following cases (1)-(4). Accordingly, the vehicle control ECU 10 corresponds to the first deceleration target determination means and the first acceleration target determination means.

That is, the cases are: (1) a case where the value of the following KdB_c is higher than the friction brake starting threshold; (2) a case where the value of the following KdB_c is between the friction brake starting threshold and the engine braking starting threshold; (3) a case where the value of the following KdB_c is between the engine braking starting threshold and the acceleration control ending threshold; and (4) a case where the value of the following KdB_c is lower than the acceleration control ending threshold.

In the case of (1), by determining that the friction brake is to be operated, the following required deceleration is calculated; in the case of (2), by determining that the engine braking is to be operated, the following required deceleration is calculated; in the case of (3), by determining that the own vehicle is made to travel at a uniform velocity, the following required acceleration/deceleration is calculated (zero acceleration and deceleration is calculated); and in the case of (4), by determining that acceleration is to be performed, the following required acceleration is calculated. Accordingly, the vehicle control ECU 10 corresponds to the following deceleration calculation means and the following acceleration calculation means.

The following required acceleration/deceleration GDp1 in the case of decelerating or accelerating the own vehicle is calculated by Equation 5 in the following, for example. A plus value means a following required acceleration and a minus value means a following required deceleration. It is assumed that GDp1=0 means a following required acceleration, for example.

(Equation 5)

$$G_{Dp}1 = (Vr1 - Vr\_t1)/T \qquad \text{(Eq. 5)}$$

Vr1 in Equation 5 expresses the current relative velocity of the own vehicle to the following-target preceding vehicle, as described above, and Vr_t1 is a target relative velocity obtained by substituting for Equation 2 the value of the following KdB_c in the current following distance D which can be derived from the brake discriminant of Equation 4. That is, Vr_t1 is a target value of the relative velocity Vr1 to the following-target preceding vehicle which can be obtained by substituting for Equation 2 the value of the following KdB_c concerned. T is a divisor for converting the difference between the current relative velocity Vr1 of the own vehicle and the target relative velocity Vr_t1 into the following required acceleration/deceleration GDp1, and it is set suitably.

The vehicle control ECU 10 performs traveling locus determination for determining the traveling locus of the following-target preceding vehicle, based on the vehicle information (specifically, the vehicle velocity Vp and the steering angle θ of the following-target preceding vehicle) which is successively acquired via the radio communication equipment 7. Accordingly, the vehicle control ECU 10 corresponds to the traveling locus determination means.

It is assumed that the own vehicle position at a certain time is a starting point on two-dimensional coordinates as an example. Next, it is assumed that a position ahead of the starting point and distant by the length corresponding to the distance between the own vehicle and the following-target preceding vehicle, which is detected based on the signal of the radar 8, is the initial position of the following-target preceding vehicle. Then, the traveling locus of the following-target preceding vehicle is determined by calculating successively the traveling locus points following the initial position, based on the vehicle velocity and the steering angle θ of the following-target preceding vehicle which are acquired successively.

As an example, on the basis of the time lag of acquiring the vehicle velocity and steering angle θ of the following-target preceding vehicle by means of the vehicle-to-vehicle communications, with reference to the time when the signal of the radar 8 employed for deriving the distance to the following-target preceding vehicle has been obtained, and on the basis of the vehicle velocity acquired, the distance that the following-target preceding vehicle has traveled during the time lag concerned is estimated. Then, this estimated distance is subtracted from the distance between the own vehicle and the following-target preceding vehicle which has been detected based on the signal of the radar 8, thereby the initial position of the following-target preceding vehicle is determined. Subsequently, the distance traveled from the initial position of the following-target preceding vehicle is successively calculated, based on the transmission interval of the vehicle velocity and steering angle θ of the following-target preceding vehicle by means of the vehicle-to-vehicle communications and the vehicle velocity concerned, and at the same time, the direction of movement is calculated based on the steering angle θ concerned. Thereby, the traveling locus point is calculated successively. It is also preferable to adopt a configuration in which a position other than the own vehicle position is set as the starting point. "The corresponding length" described above means the length when converted into the length on the two-dimensional coordinates.

Figure 2:
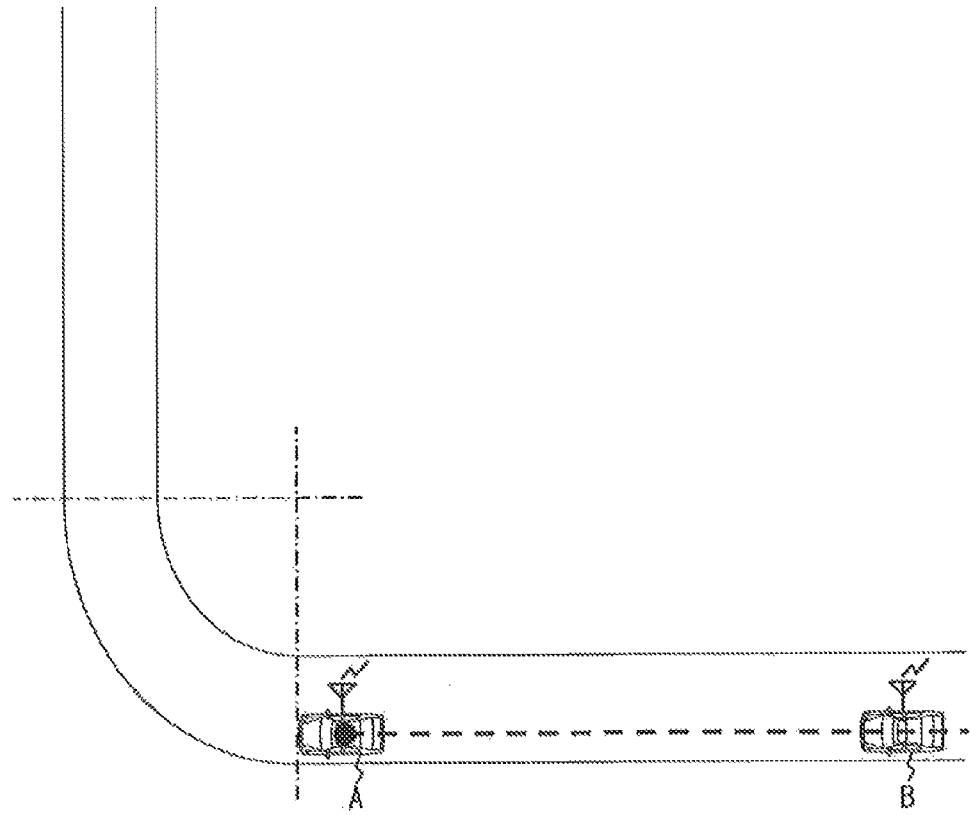
FIG. 2 is a schematic diagram illustrating an example of a traveling locus of the following-target preceding vehicle determined by traveling locus determination.

As illustrated in FIG. 2, when the own vehicle is performing following traveling to the following-target preceding vehicle (that is, when the preceding vehicle following traveling control is being performed), estimation of the traveling locus of the following-target preceding vehicle is also performed by the traveling locus determination. FIG. 2 is a schematic diagram illustrating the case where the own vehicle is performing the following traveling to the following-target preceding vehicle in a straight pathway. In FIG. 2, A indicates a following-target preceding vehicle, B indicates the own vehicle, and a dashed line expresses a traveling locus to be determined. It is preferable to adopt a configuration in which, for example, the traveling locus determination starts when the preceding vehicle following traveling control is started, and terminates when the preceding vehicle following traveling control is completed.

It is assumed that the vehicle control ECU 10 performs current position acquisition for acquiring the current position of the own vehicle, by calculating successively the current position of the own vehicle on the above-described two-dimensional coordinates, based on the own vehicle velocity Vo successively acquired from the VSC_ECU 1 of the own vehicle, and the steering angle θ successively acquired from the steering angle sensor 2 of the own vehicle. Accordingly, the vehicle control ECU 10 corresponds to the current position acquisition means.

The vehicle control ECU 10 performs road contour estimation for estimating the road contour in front of the current position of the own vehicle as the starting point, from the traveling locus of the following-target preceding vehicle which has been determined by the traveling locus determination. Accordingly, the vehicle control ECU 10 corresponds to the road contour estimation means and the road contour determination means. Specifically, the estimation is performed of the road contour having a prescribed width to right and left of the traveling locus as a center line, determined by the traveling locus determination. As an example, the estimation is performed of the road contour which has the road boundary with the width equal to the length corresponding to the distance of 1.75 m, to right and left of the traveling locus as the center line.

Next, the vehicle control ECU 10 performs curve way determination for determining whether a curve way exists ahead of the own vehicle, based on the road contour of the front estimated by the road contour estimation. Accordingly, the vehicle control ECU 10 corresponds to the curve way determination means. As an example, it is preferable to adopt a configuration in which, when a part having a curvature greater than a prescribed value exists in the road contour within the prescribed distance ahead of the current position of the own vehicle, it is determined that a curve way exists ahead of the own vehicle, and, on the contrary, when a part having a curvature greater than the prescribed value does not exist, it is determined that a curve way does not exist ahead of the own vehicle.

It is preferable to adopt a configuration in which the curvature is calculated based on the outer boundary of the road contour. The term "prescribed distance" described above means a value set up in consideration of the distance of the degree which allows for sufficient deceleration before entering a curve way, and the value can be set up arbitrarily. The term "prescribed value" described above means a value which corresponds to the curvature of the degree to which a curve way is barely recognizable, and the value can be set up arbitrarily.

The curve way referred to in the present embodiment is formed by a road contour which is estimated from the traveling locus of the following-target preceding vehicle, and it means not only an actual curve way but also a virtual curve way including a curve way indicated by the road contour which is estimated from the traveling locus of the following-target preceding vehicle turning to the right or to the left at a crossing.

When the curve way determination has determined that a curve way exists ahead of the own vehicle, the vehicle control ECU 10 determines the radius of curvature of the curve way from the road contour of the curve way estimated in the road contour estimation. Accordingly, the vehicle control ECU 10 corresponds to the curvature radius determination means. Specifically, it is preferable to adopt a configuration in which the road contour of the curve way is divided into plural sections, and the radius of curvature in each section of the curve way is calculated from the curved line of each section. It is preferable to adopt a configuration in which the curved line is specified by a curved line which indicates the outer boundary of the road contour. For example, it is preferable to adopt a configuration in which, as the radius of curvature of a curve way in the entrance position of the curve way, the radius of curvature calculated from a curved line of a section including the entrance position of the curve way is employed. The determination of the entrance position of a curve way will be explained in full detail in the following.

When the curve way determination has determined that a curve way exists ahead of the own vehicle, the vehicle control ECU 10 performs entrance determination for determining an entrance position of the curve way and exit determination for determining an exit position. Accordingly, the vehicle control ECU 10 corresponds to the entrance determination means and the exit determination means.

Figure 3:
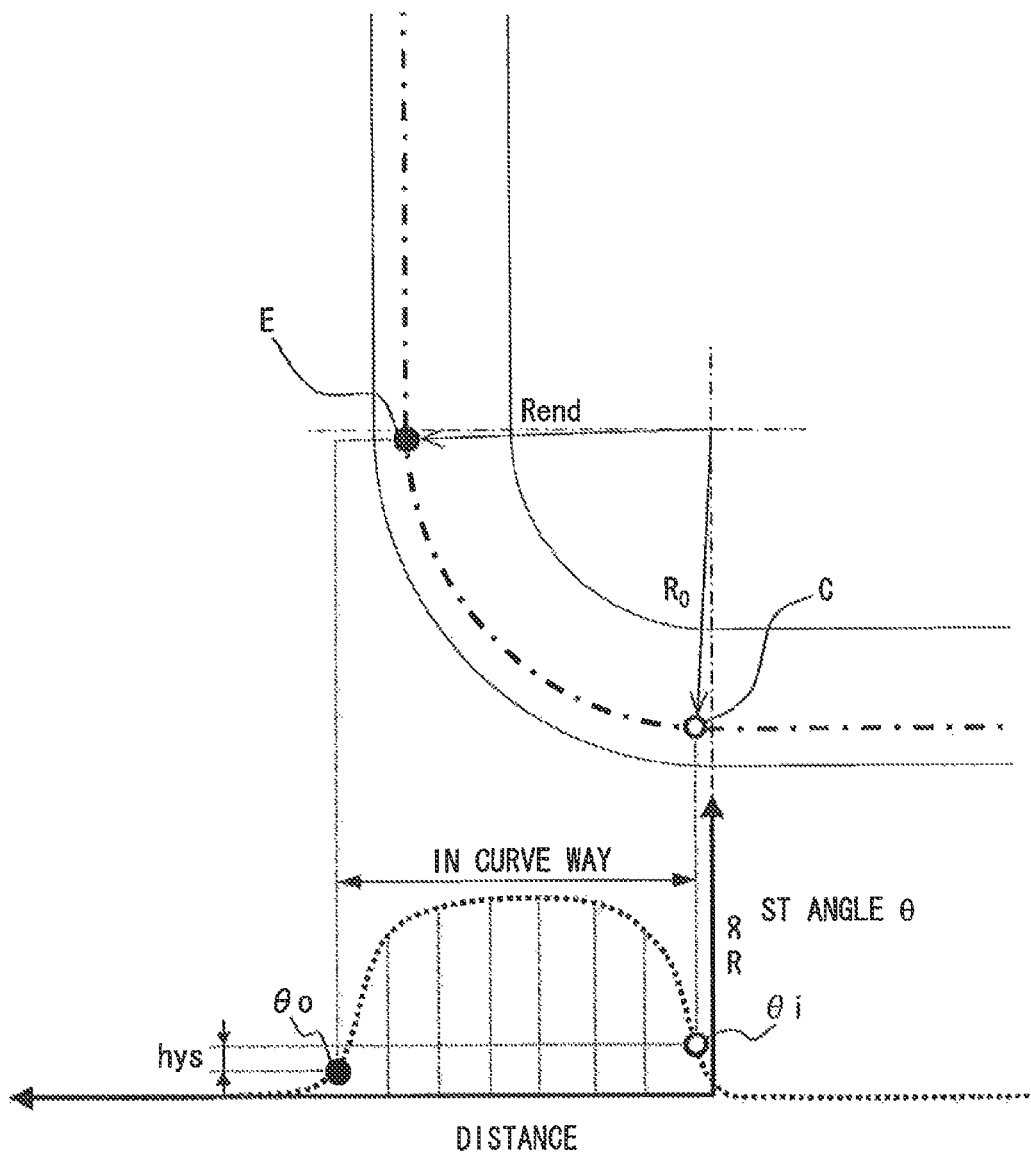
FIG. 3 is a schematic diagram for explaining a determination threshold of an entrance and an exit of a curve way.

In the entrance determination, the entrance position of the curve way is determined based on the steering angle θ of the following-target preceding vehicle, which is employed for determining the traveling locus of the following-target preceding vehicle in the curve way ahead of the own vehicle, When explained in detail, as illustrated in FIG. 3, the point where the steering angle θ concerned has reached an entrance determination threshold θi first is determined as the entrance position of the curve way. In the exit determination, the exit position of the curve way is determined based on the steering angle of the following-target preceding vehicle, which is employed for determining the traveling locus of the following-target preceding vehicle in the curve way ahead of an own vehicle. When explained in detail, as illustrated in FIG. 3, after the steering angle θ concerned has reached the entrance determination threshold θi, the point where the steering angle θ reaches the exit determination threshold θo first is determined as the exit position of the curve way.

The entrance determination threshold θi is a value greater than the steering angle of the degree to which straight-ahead traveling is not barely recognizable, and the value is set up arbitrarily. As for the exit determination threshold θo, in consideration of a hysteresis ("hys" in FIG. 3), a value smaller than the entrance determination threshold θi is set up. FIG. 3 is a schematic diagram for explaining determination thresholds of the entrance and the exit of a curve way. In FIG. 3, the dashed-dotted line expresses the line indicating the estimated outer boundary of the road contour, and the dotted line expresses the change of the steering angle θ of the following-target preceding vehicle. In FIG. 3, R0 indicates the radius of curvature in the entrance position of the curve way, and Rend indicates the radius of curvature in the exit position. In FIG. 3, the entrance position is indicated by C and the exit position is indicated by E.

Figure 4:
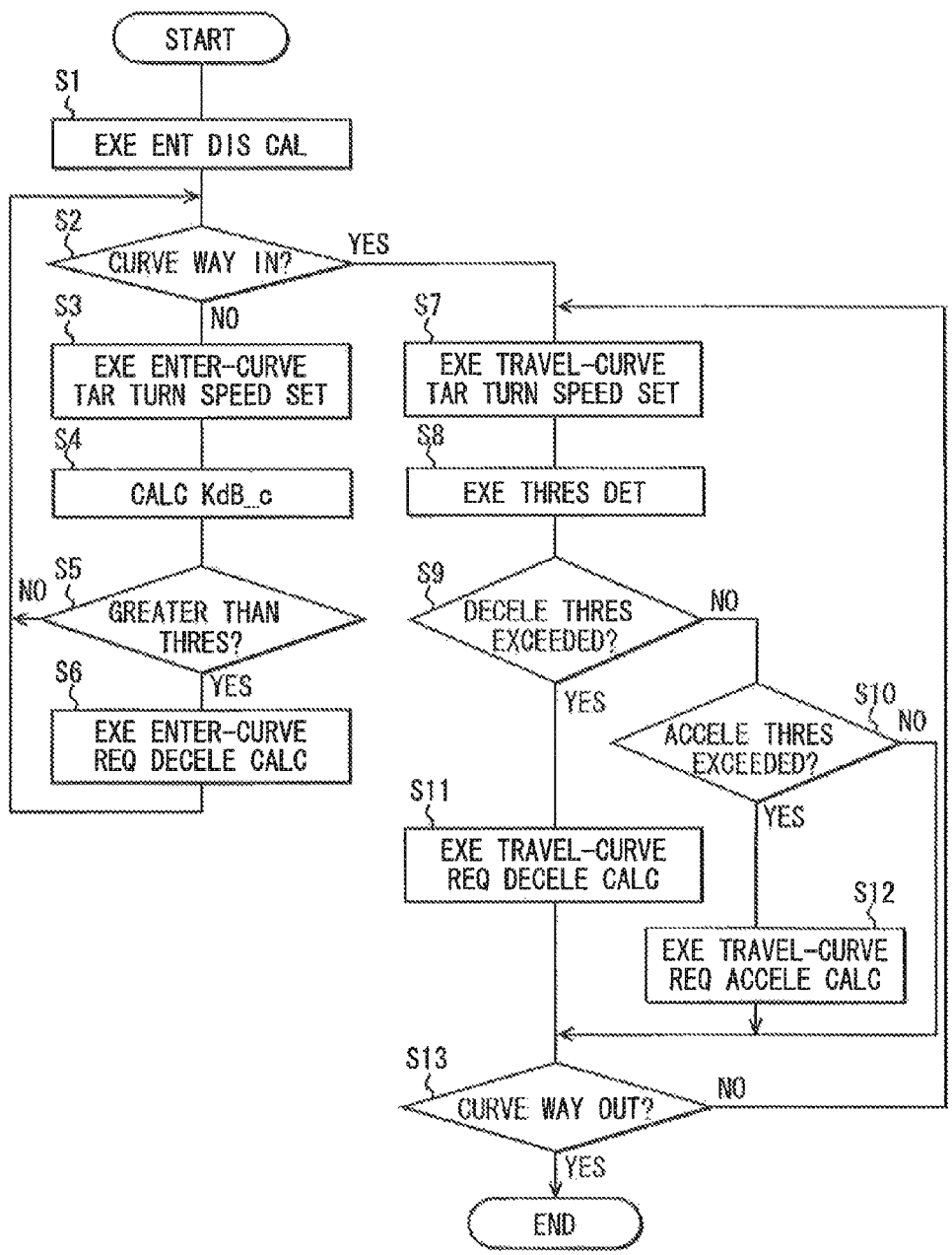
FIG. 4 is a flow chart illustrating an example of the flow of processing concerning in-curve control in a vehicle control ECU.

When the curve way determination has determined that a curve way exists ahead of the own vehicle, the vehicle control ECU 10 performs the acceleration and deceleration control depending on whether the own vehicle is located in the curve way, or located out of the curve way (hereinafter, referred to as "in-curve control"). In the following, the processing concerning the in-curve control is explained with reference to FIG. 4. FIG. 4 is a flow chart illustrating an example of the flow of processing concerning the in-curve control in the vehicle control ECU 10. The flow illustrated in FIG. 4 is started when the entrance determination determines the entrance position of the curve way ahead of the own vehicle.

Figure 5:
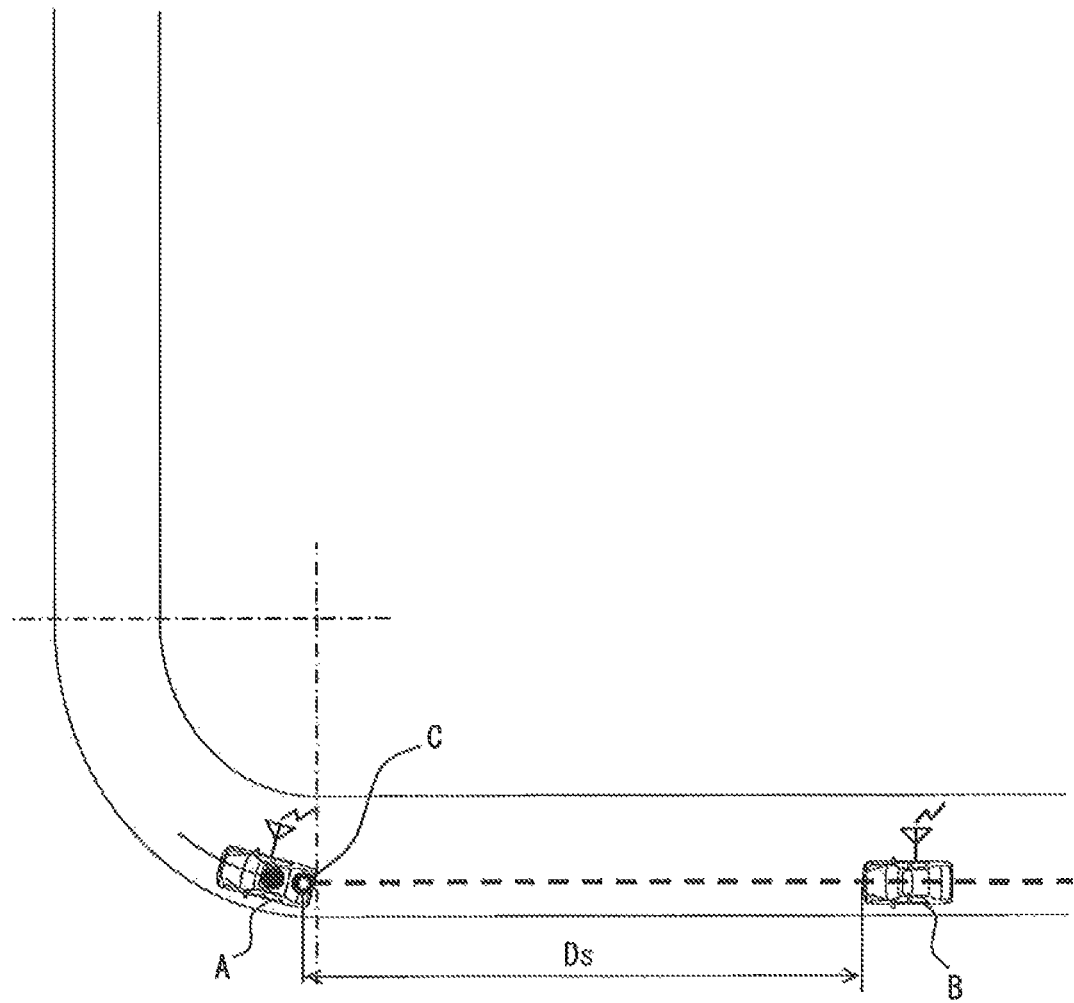
FIG. 5 is a schematic diagram for explaining a curve way entrance distance.

First, at Step S1, entrance distance calculation is performed and the flow moves to Step S2. In the entrance distance calculation, the distance between the entrance position of the curve way determined by the entrance determination and the current position of the own vehicle acquired by the current position acquisition is calculated as a distance from the own vehicle to the entrance position of the curve way (a curve way entrance distance Ds) (refer to FIG. 5). Accordingly, the vehicle control ECU 10 corresponds to the entrance distance calculation means. FIG. 5 is a schematic diagram for explaining the curve way entrance distance Ds. In FIG. 5, A indicates the following-target preceding vehicle, B indicates the own vehicle, and C indicates the entrance position of the curve way. The dashed line expresses the traveling locus of the following-target preceding vehicle.

At Step S2, entering-a-curve-way determination is performed. In the entering-a-curve-way determination, it is determined whether the own vehicle has entered the curve way, based on the curve way entrance distance Ds calculated by the entrance distance calculation. Accordingly, the vehicle control ECU 10 corresponds to the entering-a-curve determination means. It is preferable to adopt a configuration in which, for example, when the value of Ds is greater than zero, it is determined that the own vehicle has not entered the curve way, and when the value of Ds is equal to or less than zero, it is determined that the own vehicle has entered the curve way. When it is determined that the own vehicle has entered the curve way (YES at Step S2), the flow moves to Step S7. When it is determined that the own vehicle has not entered the curve way (NO at Step S2), the flow moves to Step S3.

At Step S3, entering-a-curve target turning velocity setting is performed, and the flow moves to Step S4. In the entering-a-curve target turning velocity setting, the target turning velocity at the time of passing through the entrance position of the curve way (hereinafter, referred to as "an entering-a-curve target turning velocity Vt1") is calculated by Equation 6, based on the radius of curvature R0 in the entrance position of the curve way and a target lateral acceleration Gyt as a target set up in advance when the own vehicle travels in a curve way.

(Equation 6)

$$Vr1 = \sqrt{R0 \times Gyt} \qquad \text{(Eq. 6)}$$

Then, the calculated target turning velocity is set up as the entering-a-curve target turning velocity Vt1. Accordingly, the vehicle control ECU 10 corresponds to the target turning velocity setting means. It is preferable to adopt a configuration in which the target lateral acceleration Gyt employs a default value. However, the present embodiment adopts a configuration in which a value received in advance by the input of the driver via the operation SW 9 is employed.

At Step S4, the current value of the compensated approaching/separating state evaluation index KdB_c (hereinafter referred to as the first curve way KdB_c") is calculated in consideration of the curve way entrance distance Ds and the relative velocity of the own vehicle to the entrance position of the curve way (hereinafter referred to as "a curve entrance-referenced relative velocity Vr2"), and the flow moves to Step S5. The curve entrance-referenced relative velocity Vr2 is a velocity difference between the entering-a-curve target turning velocity Vt1 and the own vehicle velocity V0, and is calculated by Equation 7 in the following. Accordingly, the vehicle control ECU 10 corresponds to the curve entrance-referenced relative velocity calculation means. The first curve way KdB_c is calculated from the evaluation index calculating equation shown by Equation 8.

(Equation 7)

$$Vr2 = Vr1 - Vo \qquad \text{(Eq. 7)}$$

(Equation 8)

$$\begin{cases} KdB\_c(a) = 10 \times \\ \log_{10}\left(\left|4 \times 10^7 \times \frac{Vr2 - aVt1}{Ds^3}\right|\right) \text{sgn}(-Vr2) & \left(\left|4 \times 10^7 \times \frac{Vr2 - aVt1}{Ds^3}\right|\right) > 1 \\ 0 & \left(\left|4 \times 10^7 \times \frac{Vr2 - aVt1}{Ds^3}\right|\right) \leq 1 \end{cases} \qquad \text{(Eq. 8)}$$

It has been proved that Equation 2 described above is an index which expresses well the timing to which the driver of the own vehicle starts deceleration in the situation where a preceding vehicle exists. In Equation 8, the curve way entrance distance Ds is employed in lieu of D in Equation 2, the entering-a-curve target turning velocity Vt1 is employed in lieu of Vp, and the curve entrance-referenced relative velocity Vr2, which is the velocity difference between Vt1 and the own vehicle velocity V0, is employed in lieu of Vr1. Therefore, Equation 8 can be said to express the conditions that the driver starts deceleration operation when the own vehicle velocity Vo in the entrance position of the curve way is set to the entering-a-curve target turning velocity Vt1.

Equation 8 is an index which indicates the approaching/separating state to the entrance position of the curve way in consideration of the entering-a-curve target turning velocity Vt1, and which becomes larger as the curve entrance-referenced relative velocity Vr2 becomes higher, and of which the increasing gradient becomes steeper as the distance Ds to the entrance position of the curve way becomes shorter. Accordingly, the first curve way KdB_c corresponds to the second compensated approaching/separating state evaluation index, and the vehicle control ECU 10 corresponds to the second evaluation index calculation means.

At Step S5, in order to determine whether to start the deceleration of the own vehicle (that is, whether the deceleration starting point is reached), it is determined whether the first curve way KdB_c calculated at Step S4 has exceeded the deceleration threshold defined by the brake discriminant which has replaced D of the brake discriminant expressed by Equation 4 with the curve way entrance distance Ds. This deceleration threshold is a value obtained by substituting the current curve way entrance distance Ds for the brake discriminant concerned. Accordingly, the deceleration threshold corresponds to the second deceleration threshold, and the vehicle control ECU 10 corresponds to the deceleration starting determination means. When it is determined that it has exceeded (YES at Step S5), the flow moves to Step S6. When it is determined that it has not exceeded (NO at Step S5), the flow returns to Step S2 and the flow is repeated.

At Step S6, entering-a-curve required deceleration calculation is performed, and the flow returns to Step S2. In the entering-a-curve required deceleration calculation, an entering-a-curve required deceleration GDp2 in decelerating the own vehicle is calculated by Equation 9 in the following. Accordingly, the vehicle control ECU 10 corresponds to the curve way deceleration calculation means.

(Equation 9)

$$G_{Dp}2 = (Vr2 - Vr\_t2)/T \quad \text{(Eq. 9)}$$

In Equation 9, Vr2 is the curve entrance-referenced relative velocity described above, and Vr_t2 is the target relative velocity obtained by substituting for Equation 10 the value of the first curve way KdB_c for the distance Ds to the entrance position of the curve way. The first curve way KdB_c for the distance Ds can be found from the brake discriminant which has replaced D of the brake discriminant expressed by Equation 4 with the curve way entrance distance Ds. That is, Vr_t2 is the target value of the curve entrance-referenced relative velocity Vr2 which is obtained by substituting the value of the first curve way kdB_c concerned for Equation 10. T is a divisor for converting the difference between the curve entrance-referenced relative velocity Vr2 and the target relative velocity Vr_t2 into the entering-a-curve required deceleration GDp2, and T is set up suitably.

(Equation 10)

$$KdB\_c(a) = 10 \times \log_{10}\left\{\left|4 \times 10^7 \times \frac{Vr2 - aVt1}{Ds^3}\right|\right\} \quad \text{(Eq. 10)}$$

Figure 6:
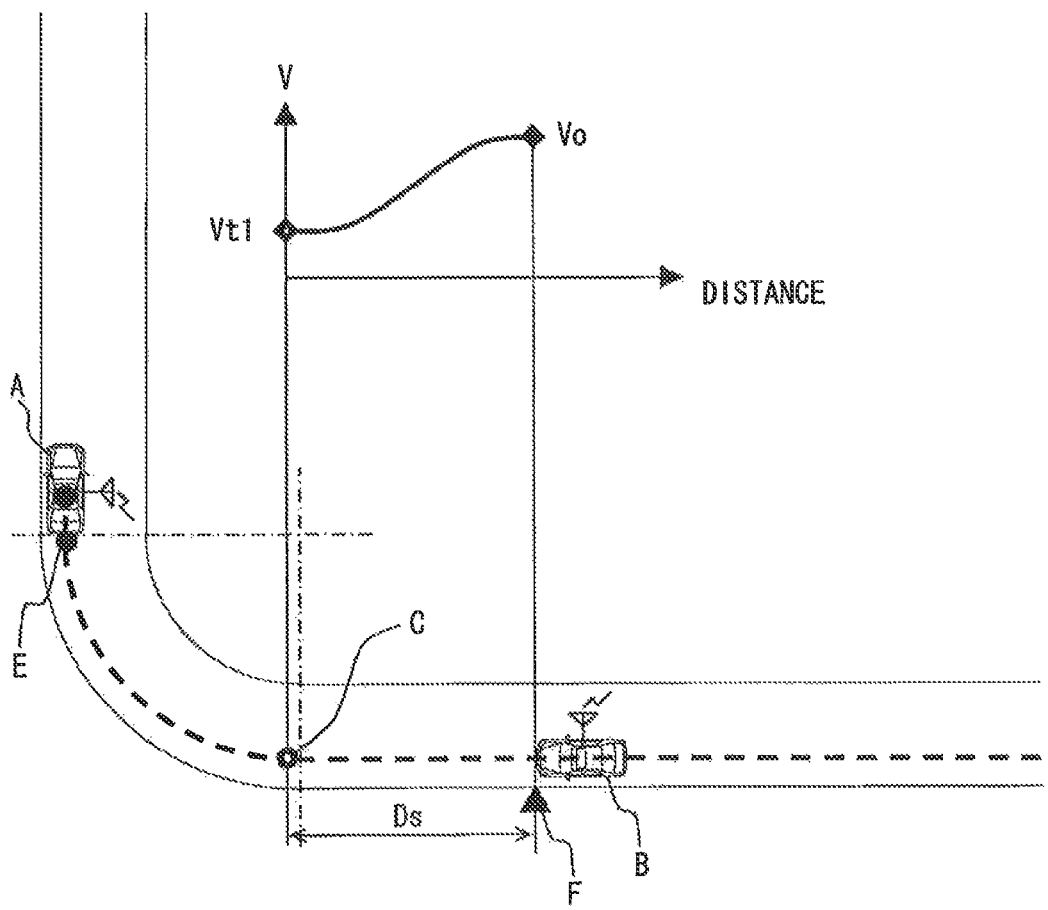
FIG. 6 is a schematic diagram for explaining deceleration control to an entrance position of a curve way in the in-curve control.
Figure 7:
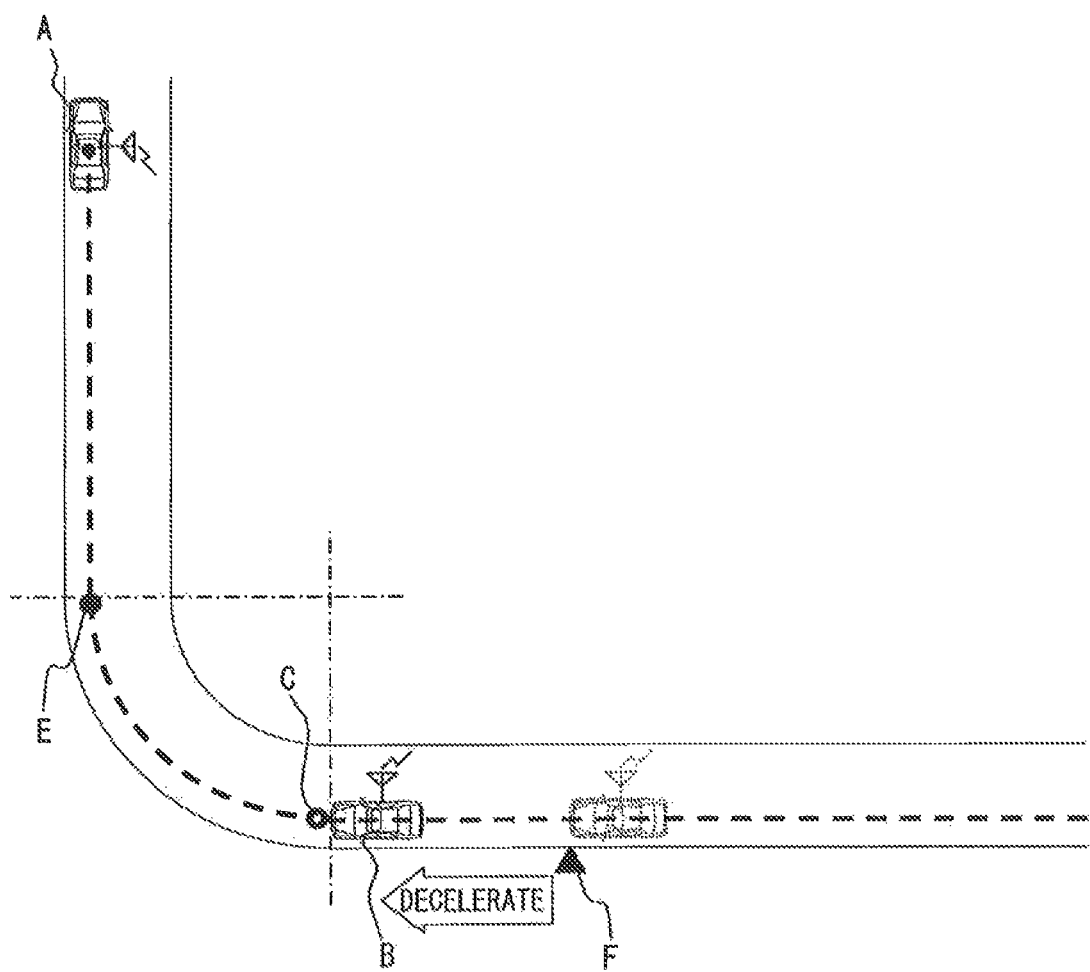
FIG. 7 is a schematic diagram for explaining the deceleration end in an entrance position of a curve way in the in-curve control.

When the present entering-a-curve required deceleration GDp2 is calculated and outputted successively from the time of reaching the deceleration starting point, the deceleration control is performed so that the own vehicle velocity Vo becomes equal to the entering-a-curve target turning velocity Vt1, when arriving at the entrance position of the curve way, as illustrated in FIG. 6. Accordingly, as illustrated in FIG. 7, when the own vehicle arrives at the entrance position of the curve way, the own vehicle velocity Vo is decelerated to the entering-a-curve target turning velocity Vt1. FIG. 6 is a schematic diagram for explaining the deceleration control to the entrance position of the curve way in the in-curve control. FIG. 7 is a schematic diagram for explaining the deceleration end in the entrance position of the curve way in the in-curve control. In the figures, A indicates the following-target preceding vehicle, B indicates the own vehicle, C indicates the entrance position of the curve way, E indicates the exit of the curve way, and F indicates the deceleration starting point. The dashed line expresses the traveling locus of the following-target preceding vehicle.

At Step S7, traveling-a-curve target turning velocity setting is performed, and the flow moves to Step S8. In the traveling-a-curve target turning velocity setting, the target turning velocity at the time of traveling in the curve way (hereinafter referred to as "an in-curve target turning velocity Vt2") is calculated by Equation 11, based on the radius of curvature Rn in the traveling position of the own vehicle in the curve way and the above-described target lateral acceleration Gyt.

(Equation 11)

$$Vr2 = \sqrt{Rn \times Gyt} \quad \text{(Eq. 11)}$$

Figure 8:
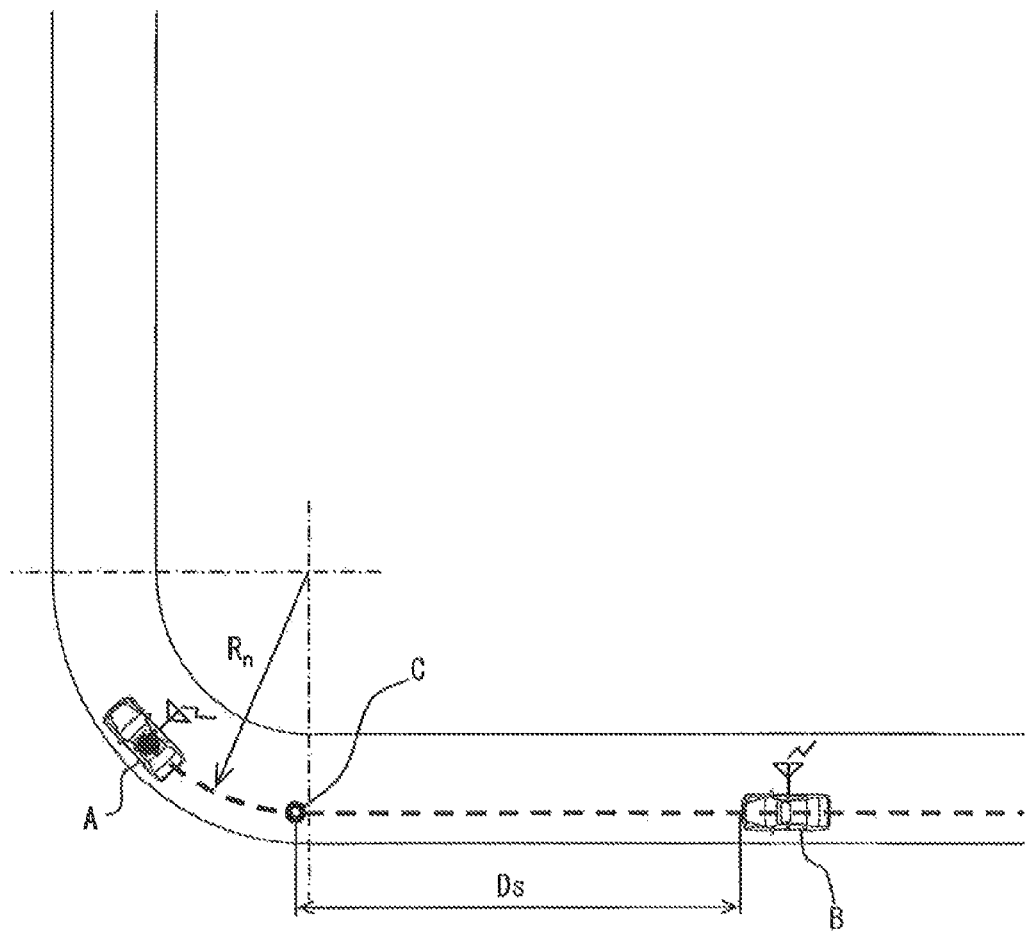
FIG. 8 is a schematic diagram for explaining a radius of curvature.

As for the radius of curvature Rn, it is preferable to adopt a configuration in which the radius of curvature Rn in every point in the curve way is calculated from the road locus in the curve way which can be estimated successively based on the vehicle information acquired from the following-target preceding vehicle traveling in the curve way, for example (Refer to FIG. 8). FIG. 8 is a schematic diagram for explaining the radius of curvature Rn. In FIG. 8, A indicates the following-target preceding vehicle, B indicates the own vehicle, and C indicates the entrance position of the curve way. The dashed line expresses the traveling locus of the following-target preceding vehicle.

At Step S8, threshold determination is performed and the flow moves to Step S9. In the threshold determination, the current value of the compensated approaching/separating state evaluation index KdB_c (hereinafter referred to as "the second curve way KdB_c") is calculated, in consideration of the difference between the road boundary distance Do which is the distance to the road boundary of the virtual curve way and the proper boundary distance Dc which is the proper distance to the road boundary concerned, and the relative velocity of the own vehicle to the virtual road boundary of the curve way (hereinafter referred to as "a curve boundary-referenced relative velocity Vr3").

The road boundary distance Do is the distance between the own vehicle and the road boundary of the curve way located on the extension of the direction of movement of the own vehicle. It is preferable to adopt a configuration in which the road boundary distance Do is calculated from the current position of the own vehicle and the virtual road contour in the two-dimensional coordinates described above. When explained in detail, it is preferable to adopt a configuration in which the road boundary distance Do is calculated from the distance between the current position of the own vehicle and the road boundary of the virtual road contour located on the extension of the direction of movement of the own vehicle. Accordingly, the vehicle control ECU 10 corresponds to the road boundary distance calculation means.

The proper boundary distance Dc is calculated by Equation 12 in the following. The proper boundary distance Dc means the distance from the front edge of the own vehicle to the road boundary of the curve way located at the front of the own vehicle when the own vehicle travels in the circular orbit of a proper turning radius Rn−L. It is preferable to adopt a configuration in which the proper turning radius Rn−L is calculated by subtracting the distance L extending from the vehicle center line in the vehicle width direction to the road boundary, from the radius of curvature Rn in the traveling position of the own vehicle in the curve way. L is a transverse position of the own vehicle to the estimated road contour, and is determined based on the distance between the current position of the own vehicle acquired by the current position acquisition and the road boundary of the road contour concerned. Accordingly, the vehicle control ECU 10 corresponds to the proper boundary distance determination means.

(Equation 12)

$$Dc = \sqrt{Rn^2 - (Rn-L)^2} \quad \text{(Eq. 12)}$$

The curve boundary-referenced target relative velocity Vr3 is a velocity difference between the in-curve target turning velocity Vt2 and the own vehicle velocity Vo, and it is calculated by the equation of Vr3=Vt2−Vo. Accordingly, the vehicle control ECU 10 corresponds to the curve boundary-referenced relative velocity calculation means. The second curve way KdB_c is calculated from the evaluation index calculating equation expressed in Equation 13.

(Equation 13)

$$\text{KdB\_c}(a) = 10 \times \log_{10}\left\{\left|4 \times 10^7 \times \frac{Vr3 - aVt2}{(Do - Dc)^3}\right|\right\} \qquad \text{(Eq. 13)}$$

It has been proved that Equation 2 described above is an index which expresses well the timing to which the driver of the own vehicle starts deceleration in the situation where a preceding vehicle exists. In Equation 13 a difference (Do−Dc) between the road boundary distance Do and the proper boundary distance Dc is employed in lieu of D in Equation 2, the in-curve target turning velocity Vt2 is employed in lieu of Vp, and the curve boundary-referenced relative velocity Vr3, which is a velocity difference between the Vt2 and the own vehicle velocity Vo, is employed in lieu of Vr1. Therefore, Equation 13 can be said to express the conditions that the driver start deceleration operation when the own vehicle velocity Vo in the proper boundary distance Dc is set to the in-curve target turning velocity Vt2.

Equation 13 is an index which indicates the approaching/separating state to the road boundary of the curve way (when described in further detail, a point separated from the road boundary by the proper boundary distance Dc) in consideration of the in-curve target turning velocity Vt2, and which becomes larger as the curve boundary-referenced relative velocity Vr3 becomes higher, and of which the increasing gradient becomes steeper as the difference (Do−Dc) between the road boundary distance Do and the proper boundary distance Dc becomes smaller. Accordingly, the second curve way KdB_c corresponds to the third compensated approaching/separating state evaluation index and the vehicle control ECU 10 corresponds to the third evaluation index calculation means.

In the threshold determination, in order to determine whether the acceleration and deceleration of an own vehicle are to be started, it is determined whether the calculated second curve way KdB_c has become greater than the deceleration threshold or less than the acceleration threshold. The deceleration threshold and the acceleration threshold employed here are a value obtained by substituting the difference (Do−Dc) between the road boundary distance Do and the proper boundary distance Dc for the equation expressing the brake discriminant added with the offset value. Here the brake discriminant has replaced D in the brake discriminant expressed in Equation 4 with the difference (Do−Dc) between the road boundary distance Do and the proper boundary distance Dc. Accordingly, the deceleration threshold corresponds to the third deceleration threshold, the acceleration threshold corresponds to the second acceleration threshold, and the vehicle control ECU 10 corresponds to the second deceleration target determination means and the second acceleration target determination means.

It is preferable to adopt a configuration in which the offset value uses the same value as described above. It may be preferable to adopt a configuration in which the deceleration threshold uses the threshold for starting the friction brake and the threshold for starting the engine braking; however, in the present embodiment, it is more preferable to adopt a configuration in which the threshold for starting the engine braking is used. It is also possible to adopt a configuration in which a common value is employed as the deceleration threshold and the acceleration threshold.

When it is determined that the second curve way KdB_c is greater than the deceleration threshold (YES at Step S9), the flow moves to Step S11. When it is determined that the second curve way KdB_c in not greater than the deceleration threshold (NO at Step S9), the flow moves to Step S10. Next, at Step S10, when it is determined that the second curve way KdB_c is less than the acceleration threshold (YES at Step S10), the flow moves to Step S12. When it is not determined that the second curve way KdB_c is less than the acceleration threshold (NO at Step S10), the required acceleration/deceleration is calculated to be 0 (for example, the traveling-a-curve required acceleration is 0), and the flow moves to Step S13.

At Step S11, traveling-a-curve required deceleration calculation is performed and the flow moves to Step S13. In the traveling-a-curve required deceleration calculation, the traveling-a-curve required acceleration/deceleration GDp3 in the case of decelerating the own vehicle (when described in further detail, the traveling-a-curve required deceleration with a negative value) is calculated by Equation 14.

(Equation 14)

$$G_{Dp}3 = (Vr3 - Vr\_t3)/T \qquad \text{(Eq. 14)}$$

In Equation 14, Vr3 expresses the curve boundary-referenced relative velocity described above, and Vr_t3 is a target relative velocity which is obtained by substituting for Equation 14 the value of the second curve way KdB_c obtained from the brake discriminant which has replaced D of the brake discriminant expressed in Equation 4 with the difference (Do−Dc) between the road boundary distance Do and the proper boundary distance Dc. That is, Vr_t3 is the target value of the curve boundary-referenced relative velocity Vr3, which is obtained by substituting the value of the second curve way KdB_c concerned for Equation 14. T is a divisor for converting the difference between the curve boundary-referenced relative velocity Vr3 and the target relative velocity Vr_t3 into the traveling-a-curve required acceleration/deceleration GDp3, and T is set up suitably.

At Step S12, traveling-a-curve required acceleration calculation is performed and the flow moves to Step S13. In the traveling-a-curve required acceleration calculation, the traveling-a-curve required acceleration/deceleration GDp3 in the case of accelerating the own vehicle (when described in further detail, the traveling-a-curve required acceleration with a plus value) is calculated by Equation 14. Accordingly, the vehicle control ECU 10 corresponds to the curve way acceleration calculation means.

At Step S13, leaving-a-curve-way determination is performed. In the leaving-a-curve-way determination, it is determined whether the own vehicle has left the curve way, based on the exit position of the curve way determined by the exit determination and the own vehicle position acquired by the current position acquisition. Accordingly, the vehicle control ECU 10 corresponds to the leaving-a-curve determination means. For example, it is preferable to adopt a configuration in which, when the own vehicle position has crossed the exit position of the curve way, it is determined that the own vehicle has left the curve way, and when the own vehicle position has not crossed the exit position of the curve way, it is determined that the own vehicle has not left the curve way. When it is determined that the own vehicle has left the curve way (YES at Step S13), the flow is terminated. When it is determined that the own vehicle has not left the curve way (NO at Step S13), the flow returns to Step S7 and the flow is repeated.

When it is determined that the own vehicle has left the curve way, the vehicle control ECU 10 stops calculation of the required acceleration/deceleration in the traveling-a-curve required deceleration calculation and the traveling-a-curve required acceleration calculation, and permits the output of a required acceleration/deceleration of a greater value than the required acceleration/deceleration concerned. Accordingly, after having left the curve way, it becomes possible to accelerate the own vehicle to the vehicle velocity exceeding the in-curve target turning velocity Vt2. For example, as the vehicle velocity exceeding the in-curve target turning velocity Vt2, there are the set vehicle velocity of the own vehicle, the vehicle velocity according to the above-described following required acceleration, etc.

The vehicle control ECU 10 performs the required acceleration/deceleration output determination for determining which one of the required acceleration/deceleration calculated in the preceding vehicle following traveling control, and the required acceleration/deceleration calculated in the in-curve control is outputted. In the following, the processing concerning the required acceleration/deceleration output determination is explained with reference to FIG. 9. FIG. 9 is a flow chart illustrating an example of the flow of the required acceleration/deceleration output determination in the vehicle control ECU 10. The flow of FIG. 9 is started when a required acceleration/deceleration is calculated in the preceding vehicle following traveling control.

First, at Step S21, calculation determination is performed and the flow moves to Step S22. In the calculation determination, it is determined whether the required acceleration/deceleration is calculated in both of the preceding vehicle following traveling control and the in-curve control. For example, in the preceding vehicle following traveling control, the required acceleration/deceleration is calculated successively. However, in the in-curve control, the required acceleration/deceleration is not calculated until it is determined that a curve way exists ahead of the own vehicle in the curve way determination.

At Step S22, when it is determined that the required acceleration/deceleration has been calculated in both of the preceding vehicle following traveling control and the in-curve control (that is, calculated in both) (YES at Step S22), the flow moves to Step S23. When it is determined that the required acceleration/deceleration has not been calculated in the in-curve control (NO at Step S22), the flow moves to Step S28.

At Step S23, it is determined whether the required deceleration has been calculated in both of the preceding vehicle following traveling control and the in-curve control. When explained in detail, it is the case where the following required deceleration is calculated in the preceding vehicle following traveling control, and the entering-a-curve required deceleration or the traveling-a-curve required deceleration is calculated in the in-curve control. When it is determined that the required deceleration has been calculated in both control (YES at Step S23), the flow moves to Step S25. When it is determined that the required deceleration has not been calculated at least in one of the control (NO at Step S23), the flow moves to Step S24.

At Step S24, it is determined whether the required acceleration has been calculated in both of the preceding vehicle following traveling control and the in-curve control. When explained in detail, it is a case where the following required acceleration is calculated in the preceding vehicle following traveling control, and the traveling-a-curve required acceleration is calculated in the in-curve control. When it is determined that the required acceleration has been calculated in both (YES at Step S24), the flow moves to Step S26. When it is determined that the required acceleration has not been calculated in one of the control (NO at Step S24), the flow moves to Step S27.

At Step S25, the first comparison outputting is performed and the flow is terminated. The first comparison outputting compares the following required deceleration calculated in the preceding vehicle following traveling control with the entering-a-curve required deceleration or the traveling-a-curve required deceleration calculated in the in-curve control, and outputs the one having a smaller value to the VSC_ECU 1 or the ENG_ECU 5. In other words, the one having a greater absolute value is outputted to the VSC_ECU 1 or the ENG_ECU 5, because the deceleration is a negative value. Accordingly, the vehicle control ECU 10 corresponds to the comparison means.

When both values are equal, the value of one of the required decelerations is outputted to the VSC_ECU 1 or the ENG_ECU 5. For example, it is preferable to adopt a configuration in which the following required deceleration is outputted when both values are equal. The VSC_ECU 1 performs the deceleration control using a brake actuator (not shown) so that the required deceleration inputted from vehicle control ECU 10 is generated in an own vehicle. The ENG_ECU 5 performs deceleration control using a throttle actuator (not shown).

At Step S26, second comparison outputting is performed and the flow is terminated. The second comparison outputting compares the following required acceleration calculated in the preceding vehicle following traveling control with the traveling-a-curve required acceleration calculated in the in-curve control, and the one having a smaller value is outputted to the ENG_ECU 5. In other words, the one having a smaller absolute value is outputted to the ENG_ECU 5, because the acceleration is a positive value.

When both values are equal, the value of one of the required accelerations is outputted to the ENG_ECU 5. For example, it is preferable to adopt a configuration in which the following required acceleration is outputted, when both values are equal. The ENG_ECU 5 executes the acceleration control using a throttle actuator (not shown).

At Step S27, selection outputting is performed and the flow is terminated. In the selection outputting, when the required deceleration (the following required deceleration) is calculated in the preceding vehicle following traveling control and the required acceleration (the traveling-a-curve required acceleration) is calculated in the in-curve control, only the required deceleration is outputted to the VSC_ECU 1 or the ENG_ECU 5.

According to the present configuration, even in the case where the velocity of the own vehicle is less than the target turning velocity of a curve way while the own vehicle is traveling in the curve way, when it is necessary to decelerate because the following distance to the preceding vehicle is shorter than the target following distance, it becomes possible not to accelerate but to decelerate. Accordingly, it becomes possible to execute reliably the deceleration control corresponding to the feeling of danger of the driver at the time of traveling in a curve way, and it becomes possible to realize the following traveling with little feeling of discomfort for a driver.

In the selection outputting, when the required acceleration (the following required acceleration) is calculated in the preceding vehicle following traveling control and the required deceleration (the entering-a-curve required deceleration or the traveling-a-curve required acceleration) is calculated in the in-curve control, only the required deceleration is outputted to the VSC_ECU 1 or the ENG_ECU 5.

According to the present configuration, even in the case where the preceding vehicle accelerates while the own vehicle travels in a curve way, and the following distance departs from the target following distance, when it is necessary to decelerate because the velocity of the own vehicle has exceeded the target turning velocity of the curve way, it becomes possible not to accelerate but to decelerate. Accordingly, it becomes possible to execute furthermore reliably the deceleration control corresponding to the feeling of danger of the driver at the time of traveling a curve way.

At Step S28, the required acceleration/deceleration (the following required acceleration or the following required deceleration) calculated in the preceding vehicle following traveling control is outputted. When explained in detail, the following required acceleration is outputted to the ENG_ECU 5 and the following required deceleration is outputted to the VSC_ECU 1 or the ENG_ECU 5.

According to the above configuration, it is possible to calculate the required deceleration so that the reduction degree of the relative velocity with respect to the preceding vehicle becomes greater as the own vehicle approaches the preceding vehicle. Therefore, by decelerating the own vehicle in accordance with the required deceleration, it becomes possible for a driver to get a favorable feeling of deceleration and to perform the following traveling with little feeling of discomfort for the driver. It is possible for the driver of the own vehicle to perform the acceleration in the following traveling which provides a favorable accelerating feeling in various traveling scenes, by use of the compensated approaching/separating state evaluation index KdB_c. Accordingly, it becomes also possible to realize the following traveling with little feeling of discomfort for the driver.

Furthermore, according to the above configuration, it is possible to start the deceleration control to the timing corresponding to the feeling (feeling of danger) of the driver at the time of passing a curve way at the entering-a-curve target turning velocity Vt1, and to enter the curve way at the entering-a-curve target turning velocity Vt1. The in-curve target turning velocity Vt2 is set up based on the radius of curvature Rn and the target lateral acceleration Gyt of the curve way. Accordingly, it is possible to determine successively the radius of curvature Rn of the traveling point based on the vehicle information successively obtained from the following-target preceding vehicle, and even for a curve way within which the radius of curvature of the curve way changes, it is possible to determine the in-curve target turning velocity Vt2 corresponding to the changing radius of curvature. According to the above configuration, it is possible to control the acceleration and the deceleration so as to travel in the curve way in accordance with the in-curve target turning velocity Vt2 determined in this way. Accordingly, it becomes possible to execute reliably the acceleration and deceleration control corresponding to the feeling of danger of the driver at the time of traveling in the curve way.

According to the above configuration, in the case where, if the following required deceleration is outputted, the own vehicle will enter the curve way exceeding the entering-a-curve target turning velocity Vt1, or the own vehicle will exceed the in-curve target turning velocity Vt2 in the curve way, the following required deceleration is not outputted but the traveling-a-curve required deceleration is outputted. Accordingly, issues like ones described above will not occur. On the other hand, in the case where, if the traveling-a-curve required deceleration is outputted, the following distance to the following-target preceding vehicle will become smaller than the target following distance Dt, the traveling-a-curve required deceleration is not outputted but the following required deceleration is outputted. Accordingly, it is possible to avoid approaching the preceding vehicle too much. Therefore, it is possible to perform the following traveling with little feeling of discomfort for a driver, and it becomes possible to execute more reliably the deceleration control corresponding to the feeling of danger of the driver at the time of entering a curve way.

As other points, according to the above configuration, in the curve way, a required acceleration with a smaller absolute value is outputted out of the following required acceleration and the traveling-a-curve required acceleration. Accordingly, preventing the own vehicle from exceeding the in-curve target turning velocity Vt2, it becomes possible to perform the acceleration control so that the following distance to the following-target preceding vehicle may not become too small. Therefore, it is possible to perform the following traveling with little feeling of discomfort for a driver, and it becomes possible to execute more reliably the velocity control corresponding to the feeling of danger of the driver at the time of traveling in a curve way.

According to the above configuration, a driver good at driving may set up the target lateral acceleration Gyt at a greater value (for example, 6 m/s$^2$), then, it will become possible for the driver to follow firmly in accordance with the vehicle velocity of the following-target preceding vehicle. Therefore, what is necessary for the driver is just to concentrate on steering operation. Furthermore, a newly licensed driver may set up the target lateral acceleration Gyt at a smaller value (for example, 2 m/s$^2$), then, it will become possible for the driver to follow in accordance with the velocity of the following-target preceding vehicle when the following-target preceding vehicle runs slowly. On the other hand, when the velocity of the following-target preceding vehicle is fast, deceleration is performed to the velocity at which the driver can circle in the curve way at the target lateral acceleration Gyt which the driver has set up. Accordingly, it becomes possible to perform steering operation within the driver's driving skill.

The embodiment described above has explained the configuration in which, based on the vehicle information (specifically, the velocity and the steering angle of the following-target preceding vehicle) obtained from the following-target preceding vehicle by means of the vehicle-to-vehicle communications, the followings are performed: the determination of the traveling locus of the following-target preceding vehicle, the estimation of the road contour, the determination of the existence or nonexistence of a curve way, the calculation of the radius of curvature of the curve way, the determination of the entrance position and the exit position of the curve way, etc. However, the configuration is not necessarily restricted to this. For example, it is also preferable to adopt a configuration in which the vehicle control ECU 10 of the driving support system 100 of the following-target preceding vehicle performs the followings, based on the velocity and the steering angle of the following-target preceding vehicle: the determination of the traveling locus of the following-target preceding vehicle, the estimation of the road contour, the determination of the existence or nonexistence of a curve way, the calculation of the radius of curvature of the curve way, the determination of the entrance position and the exit position of the curve way, etc., and these kinds of information are transmitted by means of the vehicle-to-vehicle communications. Furthermore, in the configuration, performing some or all of the followings may be omitted in the vehicle control ECU 10 of the own vehicle: the determination of the traveling locus of the following-target preceding vehicle, the estimation of the road contour, the determination of the existence or nonexistence of a curve way, the calculation of the radius of curvature of the curve way, the determination of the entrance position and the exit position of the curve way, etc.

It is also preferable to adopt a configuration in which, when the information on a traveling locus, a road contour, the radius of curvature of a curve way, the entrance position and the exit position of a curve way are acquired from the following-target preceding vehicle, the information is converted, in the vehicle control ECU 10 of the own vehicle, into a traveling locus, a road contour, the radius of curvature of a curve way, and the entrance position and the exit position of a curve way to the own vehicle position, based on the distance to the following-target preceding vehicle detected based on the signal of the radar 8, and the converted information is utilized.

The embodiment described above has explained the configuration in which, at the time of traveling in a curve way, preventing the road boundary distance Do from becoming less than the proper boundary distance Dc, the acceleration and deceleration control is performed so that the own vehicle velocity Vo becomes equal to the in-curve target turning velocity Vt2. However, the configuration is not necessarily restricted to this. It is also preferable to adopt a configuration in which, for example, after decelerating the own vehicle velocity Vo to the entering-a-curve target turning velocity Vt1 before passing the entrance position of a curve way, the acceleration and deceleration control is performed so that traveling to the exit position of the curve way is continued, maintaining the entering-a-curve target turning velocity Vt1, on the assumption that the radius of curvature R of a curve way is constant.

The above disclosure has the following aspects.

According to an aspect of the present disclosure, a vehicle behavior control device for acquiring information via radio communication equipment, which transmits and receives the information by inter-vehicle communication, and for controlling acceleration and deceleration of a vehicle, the vehicle behavior control device includes: a velocity acquisition device for acquiring a vehicle velocity of the vehicle successively; a current position acquisition device for acquiring a current position of the vehicle successively; a preceding vehicle determination device for determining a preceding vehicle of the vehicle, wherein the inter-vehicle communication between the vehicle and the preceding vehicle is established; a following distance detection device for detecting a following distance between the vehicle and the preceding vehicle; a preceding vehicle information acquisition device for successively acquiring preceding vehicle information, which is transmitted successively from the preceding vehicle by the inter-vehicle communication, via the radio communication equipment, wherein the preceding vehicle information includes preceding vehicle condition information providing a preceding vehicle velocity of the preceding vehicle; a relative velocity calculation device for successively calculating a relative velocity between the vehicle and the preceding vehicle according to the vehicle velocity and the preceding vehicle velocity; a first evaluation index calculation device for calculating a first evaluation index, which indicates an approaching and separating state of the vehicle with respect to the preceding vehicle in view of the preceding vehicle velocity, wherein the first evaluation index becomes larger as the relative velocity of approaching the preceding vehicle becomes higher, and the first evaluation index becomes larger as the following distance with the preceding vehicle becomes shorter, and wherein the first evaluation index has an increasing gradient with respect to a narrowing change of the following distance, the increasing gradient which becomes steeper as the following distance becomes shorter; a first deceleration target determination device for determining whether the first evaluation index exceeds a predetermined first deceleration threshold; and a following deceleration calculation device for calculating a first required deceleration when the first deceleration target determination device determines that the first evaluation index exceeds the first deceleration threshold, wherein the first required deceleration provides to match an actual relative velocity between the vehicle and the preceding vehicle with a first target relative velocity, and wherein the first target relative velocity is determined based on the first evaluation index and the following distance to the preceding vehicle.

In the above vehicle behavior control device, by setting up the first target relative velocity, it is possible to calculate the first required deceleration so that the reduction degree of the relative velocity to the preceding vehicle becomes large, as the own vehicle approaches the preceding vehicle. Therefore, by decelerating the own vehicle in accordance with the first required deceleration, it becomes possible for a driver to get a favorable feeling of deceleration and to perform the following traveling with little feeling of discomfort for the driver.

Alternatively, the preceding vehicle information may further include curve way information, which provides to determine a curvature radius of a curve way ahead of the vehicle and an entrance position of the curve way. The vehicle behavior control device may further include: a curvature radius determination device for determining the curvature radius of the curve way ahead of the vehicle, according to the preceding vehicle information; an entrance determination device for determining the entrance position of the curve way ahead of the vehicle, according to the preceding vehicle information; an entrance distance calculation device for calculating an entrance distance from the current position of the vehicle to the entrance position of the curve way; a target turning velocity setting device for successively setting up a target turning velocity while the vehicle travels in the curve way, according to the curvature radius of the curve way and a target lateral acceleration, wherein the target lateral acceleration is preliminary set when the vehicle travels in the curve way; a curve entrance-referenced relative velocity calculation device for calculating a curve entrance-referenced relative velocity according to the vehicle velocity and the target turning velocity at time of passing through an entrance of the curve way, wherein the curve entrance-referenced relative velocity is a velocity difference between the target turning velocity and the vehicle velocity; a second evaluation index calculation device for calculating a second evaluation index, which indicates an approaching and separating state of the vehicle with respect to the entrance position of the curve way in view of the target turning velocity at time of passing through the entrance of the curve way, wherein the second evaluation index becomes larger as the curve entrance-referenced relative velocity becomes higher, and an increasing gradient of the second evaluation index becomes steeper as the entrance distance from the current position to the entrance position becomes shorter; a deceleration starting determination device for determining whether the second evaluation index exceeds a predetermined second deceleration threshold; a curve way deceleration calculation device for calculating a second required deceleration when the deceleration starting determination device determines that the second evaluation index exceeds the second deceleration threshold, wherein the second required deceleration provides to match an actual curve entrance-referenced relative velocity with a second target relative velocity, and wherein the second target relative velocity is determined by the second evaluation index and the entrance distance to the entrance position of the curve way; and a comparison device for comparing the first required deceleration with the second required deceleration when the first and second required decelerations are calculated by the following deceleration calculation device and the curve way deceleration calculation device, respectively. The comparison device outputs one of the first and second required decelerations, an absolute value of which is larger than the other of the first and second required decelerations.

In the above case, the information including the velocity of the preceding vehicle may constitute a part of the information which can determine the radius of curvature of a curve way ahead of the own vehicle and an entrance position of the curve way concerned. When the second evaluation index exceeds the second deceleration threshold, by calculating the second required deceleration and starting the deceleration control, it is possible to start the deceleration control to the timing corresponding to the feeling (feeling of danger) of the driver at the time of passing a curve way at the target turning velocity, and to enter the curve way at the target turning velocity at the time of passing through the entrance of the curve way. Accordingly, in the case where, if the first required deceleration calculated by the following deceleration calculation device is outputted, the own vehicle may enter a curve way at a velocity exceeding a target turning velocity, the first required deceleration is not outputted, but the second required deceleration calculated by the curve way deceleration calculation device is outputted. Accordingly, it is possible to avoid entering a curve way at a velocity exceeding the target turning velocity. In the case where, if the second required deceleration calculated by the curve way deceleration calculation device is outputted, the following distance to the preceding vehicle may become smaller than the target following distance, the second required deceleration is not outputted, but the first required deceleration calculated by the following deceleration calculation device is outputted. Accordingly, it is possible to avoid approaching the preceding vehicle too much. Therefore, it is possible to perform the following traveling with little feeling of discomfort for a driver, and it becomes possible to execute more reliably the deceleration control corresponding to the feeling of danger of the driver at the time of entering a curve way.

Alternatively, the vehicle behavior control device may further include: a first acceleration target determination device for determining whether the first evaluation index is less than a predetermined first acceleration threshold; and a following acceleration calculation device for calculating a first required acceleration when the first acceleration target determination device determines that the first evaluation index is less than the first acceleration threshold. The first required acceleration provides to match the actual relative velocity between the vehicle and the preceding vehicle with a third target relative velocity, and the third target relative velocity is determined by the first evaluation index and the following distance to the preceding vehicle. According to the present mode, it becomes possible to perform the acceleration in the preceding vehicle following traveling by means of the first evaluation index; accordingly, it further becomes possible to realize the following traveling with little feeling of discomfort for a driver.

Alternatively, the vehicle behavior control device may further include: an entering-curve determination device for determining whether the vehicle has entered the curve way according to the entrance position of the curve way and the current position of the vehicle; a road contour determination device for determining a road contour of a road ahead of the vehicle, according to the preceding vehicle information; a road boundary distance calculation device for calculating a road boundary distance between the vehicle and a road boundary in the curve way ahead of the vehicle, according to the current position of the vehicle and the road contour; a proper boundary distance determination device for determining a proper boundary distance between the vehicle and the road boundary, according to the curvature radius of the curve way and a proper turning radius, wherein the proper turning radius is determined by the curvature radius of the curve way; a curve boundary-referenced relative velocity calculation device for calculating a curve boundary-referenced relative velocity according to the vehicle velocity of the vehicle and the target turning velocity at time of traveling in the curve way, wherein the target turning velocity is set up by the target turning velocity setting device, and wherein the curve boundary-referenced relative velocity is a velocity difference between the target turning velocity and the vehicle velocity; a third evaluation index calculation device for calculating a third evaluation index, which indicates an approaching and separating state of the vehicle with respect to the road boundary in the curve way in view of the target turning velocity at time of traveling in the curve way, wherein the third evaluation index becomes larger as the curve boundary-referenced relative velocity becomes higher, and wherein the third evaluation index has an increasing gradient, which becomes steeper as a distance obtained by subtracting the proper boundary distance from the road boundary distance in the curve way becomes shorter; a second deceleration target determination device for determining whether the third evaluation index exceeds a predetermined third deceleration threshold; a second acceleration target determination device for determining whether the third evaluation index is less than a predetermined second acceleration threshold; and a curve way acceleration calculation device for calculating a second required acceleration when the entering-curve determination device determines that the vehicle has entered the curve way and the second acceleration target determination device determines that the third evaluation index is less than the second acceleration threshold, wherein the second required acceleration provides to match an actual curve boundary-referenced relative velocity with a fourth target relative velocity, and wherein the fourth target relative velocity is determined by the third evaluation index and the distance obtained by subtracting the proper boundary distance from the road boundary distance in the curve way. When the entering-curve determination device determines that the vehicle has not entered the curve way, and the deceleration starting determination device determines that the second evaluation index exceeds the second deceleration threshold, the curve way deceleration calculation device calculates the second required deceleration. When the entering-curve determination device determines that the vehicle has entered the curve way, and the second deceleration target determination device determines that the third evaluation index exceeds the third deceleration threshold, the curve way deceleration calculation device calculates the second required deceleration. When following acceleration calculation device calculates the first required acceleration, and the curve way acceleration calculation device calculates the second required acceleration, the comparison device compares the first required acceleration with the second required acceleration. The comparison device outputs one of the first and second required accelerations, an absolute value of which is larger than the other of the first and second required accelerations. Accordingly, by setting the target value of the relative velocity, it is possible to calculate the required acceleration/deceleration so that the reduction degree of the curve boundary-referenced relative velocity becomes large, as the own vehicle approaches the road boundary in the curve way (when described in further detail, a point separated from the road boundary by the proper boundary distance). Since the target turning velocity is set up from the radius of curvature and the target lateral acceleration of a curve way, by determining successively the radius of curvature of the traveling point from the preceding vehicle information which can be obtained successively, it is possible to determine the target turning velocity corresponding to the changing radius of curvature, even for a curve way within which the radius of curvature of the curve way changes. Accordingly, it becomes possible to calculate the required acceleration/deceleration so that the own vehicle can travel in a curve way in accordance with the target turning velocity determined in this way. Therefore, by accelerating and decelerating the own vehicle in accordance with the required acceleration/deceleration, it become possible to perform the acceleration and deceleration control with little feeling of discomfort for a driver, and corresponding to the feeling of danger of the driver at the time of traveling in a curve way. According to the present configuration, in the curve way, a required deceleration with a larger absolute value is outputted out of the first required deceleration calculated by the following deceleration calculation device and the second required deceleration calculated by the curve way deceleration calculation device. Accordingly, it becomes possible to perform the deceleration control so that the target turning velocity may not be exceeded and, at the same time, the following distance to the preceding vehicle may not become too short. Furthermore, according to the above configuration, a required acceleration with a smaller absolute value is outputted out of the first required acceleration calculated by the following acceleration calculation device and the second required acceleration calculated by the curve way acceleration calculation device. Accordingly, it becomes possible to perform the acceleration control so that the target turning velocity may not be exceeded and, at the same time, the following distance to the preceding vehicle may not become too short. Therefore, it is possible to perform the following traveling with little feeling of discomfort for a driver, and it becomes possible to execute more reliably the acceleration and deceleration control corresponding to the feeling of danger of the driver at the time of traveling in a curve way.

Alternatively, when the following acceleration calculation device calculates the first required acceleration, and the curve way deceleration calculation device calculates the second required deceleration, the comparison device may output only the second required deceleration. According to the present mode, even in the case where the preceding vehicle accelerates while the own vehicle travels in a curve way, and the following distance departs from the target following distance, when it is necessary to decelerate because the velocity of the own vehicle has exceeded the target turning velocity of the curve way, it becomes possible not to accelerate but to decelerate. Accordingly, it becomes possible to execute more reliably the deceleration control corresponding to the feeling of danger of the driver at the time of traveling in a curve way. As a case where the preceding vehicle accelerates while the own vehicle is traveling in a curve way, the preceding vehicle has left the curve way and accelerates while the own vehicle is traveling in the curve way, for example.

Alternatively, when the following deceleration calculation device calculates the first required deceleration, and the curve way acceleration calculation device calculates the second required acceleration, the comparison device may output only the first required deceleration. According to the present mode, even in the case where the velocity of the own vehicle is less than the target turning velocity of a curve way while the own vehicle is traveling in the curve way, when it is necessary to decelerate because the following distance to the preceding vehicle is shorter than the target following distance, it becomes possible not to accelerate but to decelerate. Accordingly, it becomes possible to execute reliably the deceleration control corresponding to the feeling of danger of the driver at the time of traveling in a curve way, and it becomes possible to realize the following traveling with little feeling of discomfort for a driver.

Alternatively, the vehicle behavior control device may further include: an exit determination device for determining an exit position of the curve way ahead of the vehicle, according to the preceding vehicle information; and a leaving-curve determination device for determining whether the vehicle has left the curve way, according to the exit position of the curve way and the current position of the vehicle. When the leaving-curve determination device determines that the vehicle has left the curve way, the curve way deceleration calculation device stops calculating the second required deceleration, and the curve way acceleration calculation device stops calculating the second required acceleration. In this case, when the leaving-a-curve determination device determines that the own vehicle has left the curve way, calculation of the required deceleration by the curve way deceleration calculation device and calculation of the required acceleration by the curve way acceleration calculation device are stopped. Accordingly, after having left the curve way, it becomes possible to accelerate to the vehicle velocity beyond the target turning velocity of the curve way. For example, as the vehicle velocity beyond the target turning velocity of the curve way, there are a set vehicle velocity of the own vehicle and a vehicle velocity according to the required acceleration calculated by the following acceleration calculation device.

Alternatively, the preceding vehicle information may further provide to determine a traveling locus of the preceding vehicle. The preceding vehicle condition information further provides a steering angle of the preceding vehicle. The vehicle behavior control device may further include: a traveling locus determination device for determining the traveling locus of the preceding vehicle according to the preceding vehicle information; a road contour estimation device for estimating a road contour of a road ahead of the vehicle according to the traveling locus of the preceding vehicle; and a curve way determination device for determining whether the curve way exists ahead of the vehicle, according to the road contour of the road ahead of the vehicle estimated by the road contour estimation device. When the curve way determination device determines that the curve way exists, the curvature radius determination device determines the curvature radius by calculating the curvature radius of the curve way based on the road contour estimated by the road contour estimation device. When the curve way determination device determines that the curve way exists, the entrance determination device determines the entrance position of the curve way by estimating the entrance position of the curve way, based on the steering angle of the preceding vehicle acquired by the preceding vehicle information acquisition device. According to the present mode, based on the preceding vehicle information, it is possible for own equipment to determine the radius of curvature by calculating the radius of curvature of a curve way and to determine the entrance position by estimating the entrance position of a curve way.

Alternatively, the preceding vehicle information may further provide to determine a traveling locus of the preceding vehicle. The preceding vehicle condition information further provides a steering angle of the preceding vehicle. The vehicle behavior control device may further include: a traveling locus determination device for determining the traveling locus of the preceding vehicle according to the preceding vehicle information; and a curve way determination device for determining whether the curve way exists ahead of the vehicle, according to the road contour of the road ahead of the vehicle determined by the road contour determination device. The road contour determination device determines the road contour of the road ahead of the vehicle by estimating the road contour based on the traveling locus of the preceding vehicle. When the curve way determination device determines that the curve way exists, the curvature radius determination device determines the curvature radius, by calculating the curvature radius of the curve way based on the road contour estimated by the road contour determination device. When the curve way determination device determines that the curve way exists, the entrance determination device determines the entrance position of the curve way, by estimating the entrance position of the curve way based on the steering angle of the preceding vehicle acquired by the preceding vehicle information acquisition device. Also according to the present mode, based on the preceding vehicle information, it is possible for own equipment to determine the radius of curvature by calculating the radius of curvature of a curve way or to determine the entrance position by estimating the entrance position of a curve way.

Alternatively, the traveling locus of the preceding vehicle may be determined by the preceding vehicle velocity and the steering angle of the preceding vehicle, and the traveling locus determination device determines the traveling locus of the preceding vehicle, by calculating the traveling locus of the preceding vehicle based on the preceding vehicle velocity and the steering angle of the preceding vehicle. According to the present mode, it is possible for the own equipment to calculate the traveling locus of the preceding vehicle and to determine the traveling locus of the preceding vehicle concerned.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle behavior control device for acquiring information via radio communication equipment, which transmits and receives the information by inter-vehicle communication, and for controlling acceleration and deceleration of a vehicle, the vehicle behavior control device comprising:
   a velocity acquisition device for acquiring a vehicle velocity of the vehicle successively;
   a current position acquisition device for acquiring a current position of the vehicle successively;
   a preceding vehicle determination device for determining a preceding vehicle of the vehicle, wherein the inter-vehicle communication between the vehicle and the preceding vehicle is established;
   a following distance detection device for detecting a following distance between the vehicle and the preceding vehicle;
   a preceding vehicle information acquisition device for successively acquiring preceding vehicle information, which is transmitted successively from the preceding vehicle by the inter-vehicle communication, via the radio communication equipment, wherein the preceding vehicle information includes preceding vehicle condition information providing a preceding vehicle velocity of the preceding vehicle;
   a relative velocity calculation device for successively calculating a relative velocity between the vehicle and the preceding vehicle according to the vehicle velocity and the preceding vehicle velocity;
   a first evaluation index calculation device for calculating a first evaluation index, which indicates an approaching and separating state of the vehicle with respect to the preceding vehicle in view of the preceding vehicle velocity, wherein the first evaluation index becomes larger as the relative velocity of approaching the preceding vehicle becomes higher, and the first evaluation index becomes larger as the following distance with the preceding vehicle becomes shorter, and wherein the first evaluation index has an increasing gradient with respect to a narrowing change of the following distance, the increasing gradient which becomes steeper as the following distance becomes shorter;
   a first deceleration target determination device for determining whether the first evaluation index exceeds a predetermined first deceleration threshold; and
   a following deceleration calculation device for calculating a first required deceleration when the first deceleration target determination device determines that the first evaluation index exceeds the first deceleration threshold, wherein the first required deceleration provides to match an actual relative velocity between the vehicle and the preceding vehicle with a first target relative velocity, and wherein the first target relative velocity is determined based on the first evaluation index and the following distance to the preceding vehicle.

2. The vehicle behavior control device according to claim 1,
   wherein the preceding vehicle information further includes curve way information, which provides to determine a curvature radius of a curve way ahead of the vehicle and an entrance position of the curve way,
   the vehicle behavior control device further comprising:
   a curvature radius determination device for determining the curvature radius of the curve way ahead of the vehicle, according to the preceding vehicle information;
   an entrance determination device for determining the entrance position of the curve way ahead of the vehicle, according to the preceding vehicle information;
   an entrance distance calculation device for calculating an entrance distance from the current position of the vehicle to the entrance position of the curve way;
   a target turning velocity setting device for successively setting up a target turning velocity while the vehicle travels in the curve way, according to the curvature radius of the curve way and a target lateral acceleration, wherein the target lateral acceleration is preliminary set when the vehicle travels in the curve way;
   a curve entrance-referenced relative velocity calculation device for calculating a curve entrance-referenced relative velocity according to the vehicle velocity and the target turning velocity at time of passing through an entrance of the curve way, wherein the curve entrance-referenced relative velocity is a velocity difference between the target turning velocity and the vehicle velocity;
   a second evaluation index calculation device for calculating a second evaluation index, which indicates an approaching and separating state of the vehicle with respect to the entrance position of the curve way in view of the target turning velocity at time of passing through the entrance of the curve way, wherein the second evaluation index becomes larger as the curve entrance-referenced relative velocity becomes higher, and an increasing gradient of the second evaluation index becomes steeper as the entrance distance from the current position to the entrance position becomes shorter;

a deceleration starting determination device for determining whether the second evaluation index exceeds a predetermined second deceleration threshold;

a curve way deceleration calculation device for calculating a second required deceleration when the deceleration starting determination device determines that the second evaluation index exceeds the second deceleration threshold, wherein the second required deceleration provides to match an actual curve entrance-referenced relative velocity with a second target relative velocity, and wherein the second target relative velocity is determined by the second evaluation index and the entrance distance to the entrance position of the curve way; and a comparison device for comparing the first required deceleration with the second required deceleration when the first and second required decelerations are calculated by the following deceleration calculation device and the curve way deceleration calculation device, respectively, wherein the comparison device outputs one of the first and second required decelerations, an absolute value of which is larger than the other of the first and second required decelerations.

3. The vehicle behavior control device according to claim 2, further comprising:

a first acceleration target determination device for determining whether the first evaluation index is less than a predetermined first acceleration threshold; and a following acceleration calculation device for calculating a first required acceleration when the first acceleration target determination device determines that the first evaluation index is less than the first acceleration threshold, wherein the first required acceleration provides to match the actual relative velocity between the vehicle and the preceding vehicle with a third target relative velocity, and wherein the third target relative velocity is determined by the first evaluation index and the following distance to the preceding vehicle.

4. The vehicle behavior control device according to claim 3, further comprising:

an entering-curve determination device for determining whether the vehicle has entered the curve way according to the entrance position of the curve way and the current position of the vehicle;

a road contour determination device for determining a road contour of a road ahead of the vehicle, according to the preceding vehicle information;

a road boundary distance calculation device for calculating a road boundary distance between the vehicle and a road boundary in the curve way ahead of the vehicle, according to the current position of the vehicle and the road contour;

a proper boundary distance determination device for determining a proper boundary distance between the vehicle and the road boundary, according to the curvature radius of the curve way and a proper turning radius, wherein the proper turning radius is determined by the curvature radius of the curve way;

a curve boundary-referenced relative velocity calculation device for calculating a curve boundary-referenced relative velocity according to the vehicle velocity of the vehicle and the target turning velocity at time of traveling in the curve way, wherein the target turning velocity is set up by the target turning velocity setting device, and wherein the curve boundary-referenced relative velocity is a velocity difference between the target turning velocity and the vehicle velocity;

a third evaluation index calculation device for calculating a third evaluation index, which indicates an approaching and separating state of the vehicle with respect to the road boundary in the curve way in view of the target turning velocity at time of traveling in the curve way, wherein the third evaluation index becomes larger as the curve boundary-referenced relative velocity becomes higher, and wherein the third evaluation index has an increasing gradient, which becomes steeper as a distance obtained by subtracting the proper boundary distance from the road boundary distance in the curve way becomes shorter;

a second deceleration target determination device for determining whether the third evaluation index exceeds a predetermined third deceleration threshold, a second acceleration target determination device for determining whether the third evaluation index is less than a predetermined second acceleration threshold; and a curve way acceleration calculation device for calculating a second required acceleration when the entering-curve determination device determines that the vehicle has entered the curve way and the second acceleration target determination device determines that the third evaluation index is less than the second acceleration threshold, wherein the second required acceleration provides to match an actual curve boundary-referenced relative velocity with a fourth target relative velocity, and wherein the fourth target relative velocity is determined by the third evaluation index and the distance obtained by subtracting the proper boundary distance from the road boundary distance in the curve way, wherein, when the entering-curve determination device determines that the vehicle has not entered the curve way, and the deceleration starting determination device determines that the second evaluation index exceeds the second deceleration threshold, the curve way deceleration calculation device calculates the second required deceleration, wherein, when the entering-curve determination device determines that the vehicle has entered the curve way, and the second deceleration target determination device determines that the third evaluation index exceeds the third deceleration threshold, the curve way deceleration calculation device calculates the second required deceleration, wherein, when following acceleration calculation device calculates the first required acceleration, and the curve way acceleration calculation device calculates the second required acceleration, the comparison device compares the first required acceleration with the second required acceleration, and wherein the comparison device outputs one of the first and second required accelerations, an absolute value of which is larger than the other of the first and second required accelerations.

5. The vehicle behavior control device according to claim 4, wherein, when the following acceleration calculation device calculates the first required acceleration, and the curve way deceleration calculation device calculates the second required deceleration, the comparison device outputs only the second required deceleration.

6. The vehicle behavior control device according to claim 4,
wherein, when the following deceleration calculation device calculates the first required deceleration, and the curve way acceleration calculation device calculates the second required acceleration, the comparison device outputs only the first required deceleration.

7. The vehicle behavior control device according to claim 4, further comprising:
an exit determination device for determining an exit position of the curve way ahead of the vehicle, according to the preceding vehicle information; and
a leaving-curve determination device for determining whether the vehicle has left the curve way, according to the exit position of the curve way and the current position of the vehicle,
wherein, when the leaving-curve determination device determines that the vehicle has left the curve way, the curve way deceleration calculation device stops calculating the second required deceleration, and the curve way acceleration calculation device stops calculating the second required acceleration.

8. The vehicle behavior control device according to claim 1,
wherein the preceding vehicle information further provides to determine a traveling locus of the preceding vehicle,
wherein the preceding vehicle condition information further provides a steering angle of the preceding vehicle,
the vehicle behavior control device further comprising:
a traveling locus determination device for determining the traveling locus of the preceding vehicle according to the preceding vehicle information;
a road contour estimation device for estimating a road contour of a road ahead of the vehicle according to the traveling locus of the preceding vehicle; and
a curve way determination device for determining whether the curve way exists ahead of the vehicle, according to the road contour of the road ahead of the vehicle estimated by the road contour estimation device,
wherein, when the curve way determination device determines that the curve way exists, the curvature radius determination device determines the curvature radius by calculating the curvature radius of the curve way based on the road contour estimated by the road contour estimation device, and wherein, when the curve way determination device determines that the curve way exists, the entrance determination device determines the entrance position of the curve way by estimating the entrance position of the curve way, based on the steering angle of the preceding vehicle acquired by the preceding vehicle information acquisition device.

9. The vehicle behavior control device according to claim 4,
wherein the preceding vehicle information further provides to determine a traveling locus of the preceding vehicle,
wherein the preceding vehicle condition information further provides a steering angle of the preceding vehicle,
the vehicle behavior control device further comprising:
a traveling locus determination device for determining the traveling locus of the preceding vehicle according to the preceding vehicle information; and
a curve way determination device for determining whether the curve way exists ahead of the vehicle, according to the road contour of the road ahead of the vehicle determined by the road contour determination device,
wherein the road contour determination device determines the road contour of the road ahead of the vehicle by estimating the road contour based on the traveling locus of the preceding vehicle,
wherein, when the curve way determination device determines that the curve way exists, the curvature radius determination device determines the curvature radius, by calculating the curvature radius of the curve way based on the road contour estimated by the road contour determination device, and
wherein, when the curve way determination device determines that the curve way exists, the entrance determination device determines the entrance position of the curve way, by estimating the entrance position of the curve way based on the steering angle of the preceding vehicle acquired by the preceding vehicle information acquisition device.

10. The vehicle behavior control device according to claim 8,
wherein the traveling locus of the preceding vehicle is determined by the preceding vehicle velocity and the steering angle of the preceding vehicle, and
wherein the traveling locus determination device determines the traveling locus of the preceding vehicle, by calculating the traveling locus of the preceding vehicle based on the preceding vehicle velocity and the steering angle of the preceding vehicle.

* * * * *